United States Patent [19]

Tanaka et al.

[11] Patent Number: 5,793,376
[45] Date of Patent: Aug. 11, 1998

[54] METHOD OF PRODUCING IMAGE DATA, IMAGE DATA PROCESSING APPARATUS, AND RECORDING MEDIUM

[75] Inventors: Masayoshi Tanaka; Masaaki Oka; Teiji Yutaka; Kaoru Hagiwara, all of Kanagawa; Hidetoshi Ichioka, Tokyo, all of Japan

[73] Assignee: Sony Corporation, Tokyo, Japan

[21] Appl. No.: 565,683

[22] Filed: Nov. 30, 1995

[30] Foreign Application Priority Data

Dec. 2, 1994 [JP] Japan ................... 6-300020

[51] Int. Cl.[6] ........................ G06T 17/00
[52] U.S. Cl. ........................ 345/430
[58] Field of Search ................ 395/119, 130, 395/131, 133, 129

[56] References Cited

U.S. PATENT DOCUMENTS

| | | | |
|---|---|---|---|
| 4,811,124 | 3/1989 | Dujari | 369/59 X |
| 5,224,208 | 6/1993 | Miller, Jr. et al. | 395/125 |
| 5,285,275 | 2/1994 | Abe | 348/384 |
| 5,291,468 | 3/1994 | Carmon | 369/48 X |
| 5,307,450 | 4/1994 | Grossman | 395/123 |
| 5,471,450 | 11/1995 | Yonemitsu | 369/60 |
| 5,491,677 | 2/1996 | Sasaki | 369/60 |
| 5,553,208 | 9/1996 | Murata et al. | 395/125 |
| 5,561,746 | 10/1996 | Murata et al. | 395/119 |

FOREIGN PATENT DOCUMENTS

| | | |
|---|---|---|
| A-0 210 423 | 4/1987 | European Pat. Off. . |
| A-0-522-853 | 1/1993 | European Pat. Off. . |
| A-0 590 881 | 4/1994 | European Pat. Off. . |
| A-2-195-519 | 7/1988 | United Kingdom . |
| 2-231-245 | 7/1990 | United Kingdom . |
| A-2272137 | 4/1994 | United Kingdom . |
| WO 84/02027 | 5/1984 | WIPO . |

OTHER PUBLICATIONS

SMPTE Journal, vol. 100, No. 3, Mar. 1991, US, pp. 162–166, XP000178490, Vigneaux, et al.: "A Real-Time Video Mapping and Manipulating System".

Computer Graphics Principles and Practice, 2d, 1990, Addison-Wesley, Foley, et al., pp. 741–744.

Eurographics, 4–8 Sep. 1989, Amsterdam, pp. 257–268, SP000132231, Bennis and Gagalowicz: "Hierarchical Texture Synthesis on 3–D Surfaces".

Computer Technology Review, Special Summer Issue, 11 (1991) Jul., No. 9, Integrating Image Processing With Standard Workstation Platforms by David Pfeiffer, pp. 103, 104, 106 & 107.

IEEE Computer Graphics and Application, 11 (1991) Mar., No. 2, Graphics Workstations: A European Perspective by Ken Robbins, Mark Martin, Max Mehl, Allan Davison, Kieron Drake and Mel Slater, pp. 91–103.

*Primary Examiner*—Phu K. Nguyen
*Assistant Examiner*—Cliff N. Vo
*Attorney, Agent, or Firm*—Fulwider Patton Lee & Utecht, LLP

[57] ABSTRACT

A method and apparatus includes a geometry transfer engine (GTE) acting as a graphical transformation engine for converting three-dimensional image data of TMD format into two-dimensional image data by perspective view transformation, and a graphics processing unit (GPU) acting as a drawing device for transferring the two-dimensional image data in a given transmission standard to draw an image on a two-dimensional display screen. A structure of the three-dimensional image data, excluding the information to be perspective view transformed, is arranged identical to that of the given transmission standard of the two-dimensional image data. Accordingly, in the GTE, the information to be perspective view transformed is discriminated from the other data of the three-dimensional image data wherein the structure is identical to that of the given transmission standard of the two-dimensional image data, subjected to the perspective view transformation, and is combined with the other data wherein the structure is identical to that of the given transmission standard for production of the two-dimensional image data. An original format file including data to be transformed is thereby easily converted into a file having a new format.

34 Claims, 32 Drawing Sheets

FLAG:1110 OR 1111

| Rx | |
|---|---|
| Ry | |
| Rz | |
| Sy | Sx |
| * * * * * * | Sz |
| Tx | |
| Ty | |
| Tz | |

FIG.15A

FLAG:0110 OR 0111

| Rx | |
|---|---|
| Ry | |
| Rz | |
| Sy | Sx |
| * * * * * * | Sz |

FIG.15B

FLAG:1010 OR 1011

| Rx |
|---|
| Ry |
| Rz |
| Tx |
| Ty |
| Tz |

FIG.15C

FLAG:1100 OR 1101

| Sy | Sx |
|---|---|
| * * * * * * | Sz |
| Tx | |
| Ty | |
| Tz | |

FIG.15D

FLAG:0010 OR 0011

| Rx |
|---|
| Ry |
| Rz |

FIG.15E

FLAG:0100 OR 0101

| Sy | Sx |
|---|---|
| * * * * * * | Sz |

FIG.15F

FLAG:1000 OR 1001

| Tx |
|---|
| Ty |
| Tz |

FIG.15G

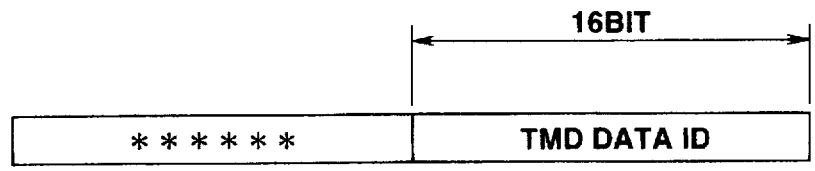
FIG.16
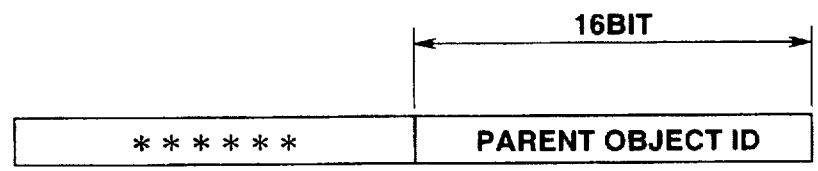
FIG.17
| R01 | R00 |
|---|---|
| R10 | R02 |
| R12 | R11 |
| R21 | R20 |
| * * * * * * | R22 |
| Tx ||
| Ty ||
| Tz ||
FIG.18

| * * * * * * | COLOR | DIRECTION | DATA TYPE |

FIG.19

FLAG:0110 OR 0111

| X |  |  |  |
|---|---|---|---|
| Y |  |  |  |
| Z |  |  |  |
| * * | B | G | R |

FIG.20A

FLAG:0100 OR 0101

| X |
|---|
| Y |
| Z |

FIG.20B

FLAG:0010 OR 0011

| * * | B | G | R |

CAMERA TYPE:0

| Z ANGLE | POSITION & REFERENCE | DATA TYPE | CAMERA TYPE = 0 |

FIG. 21B

CAMERA TYPE:1

| TRANSLATION | ROTATION | DATA TYPE | CAMERA TYPE = 1 |

| DATA TYPE | TYPE OF DATA<br>0:ABSOLUTE VALUE<br>1:DIFFERENCE FROM PRECEDING FRAME |
|---|---|
| POSITION&REFERENCE | VIEW POINT,REFERENCE LOCATION FLAG<br>0:NO<br>1:YES |
| Z ANGLE | REFERENCE ANGLE FLAG FROM HORIZONTAL<br>0:NO<br>1:YES |

FIG.22

| DATA TYPE | TYPE OF DATA<br>0:ABSOLUTE VALUE<br>1:DIFFERENCE FROM PRECEDING FRAME |
|---|---|
| ROTATION | ROTATION (R) FLAG<br>0:NO<br>1:YES |
| TRANSLATION | HORIZONTAL MOVEMENT (T) FLAG<br>0:NO<br>1:YES |

FIG.23

FLAG:1100 OR 1110

| Px |
|---|
| Py |
| Pz |
| Rx |
| Ry |
| Rz |
| Z |

FIG.24A

FLAG:0100 OR 0110

| Px |
|---|
| Py |
| Pz |
| Rx |
| Ry |
| Rz |

FIG.24B

FLAG:1000 OR 1010

| Z |
|---|

FIG.24C

FLAG:0111

| Rx |
|---|
| Ry |
| Rz |
| Tx |
| Ty |
| Tz |

FIG.25A

FLAG:0011

| Rx |
|---|
| Ry |
| Rz |

FIG.25B

FLAG:0101

| Tx |
|---|
| Ty |
| Tz |

FIG.25C

| MSB | | LSB |
|---|---|---|
| NY | | NX |
| -- | | NZ |
FIG.33
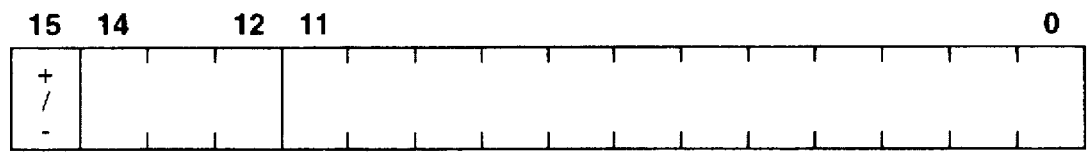
FIG.34
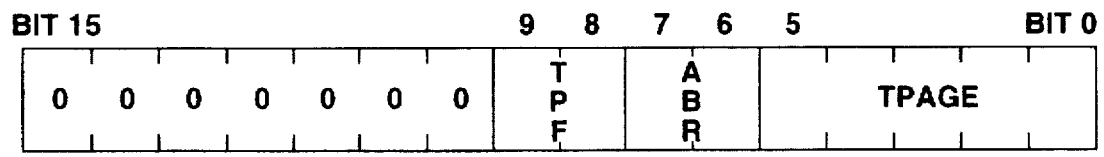
FIG.35

**FLAT,NO-TEXTURE
(SINGLE COLOR)**

| 0×20 | 0×00 | 0×03 | 0×04 |
|---|---|---|---|
| - - | B | G | R |
| VERTEX 0 | | NORMAL 0 | |
| VERTEX 2 | | VERTEX 1 | |

FIG.38A

**GOURAUD,NO-TEXTURE
(SINGLE COLOR)**

| 0×30 | 0×00 | 0×04 | 0×06 |
|---|---|---|---|
| - - | B | G | R |
| VERTEX 0 | | NORMAL 0 | |
| VERTEX 1 | | NORMAL 1 | |
| VERTEX 2 | | NORMAL 2 | |

FIG.38B

**FLAT,NO-TEXTURE
(GRADATION)**

| 0×20 | 0×04 | 0×05 | 0×06 |
|---|---|---|---|
| - - | B0 | G0 | R0 |
| - - | B1 | G1 | R1 |
| - - | B2 | G2 | R2 |
| VERTEX 0 | | NORMAL 0 | |
| VERTEX 2 | | VERTEX 1 | |

FIG.38C

**GOURAUD,NO-TEXTURE
(GRADATION)**

| 0×30 | 0×04 | 0×06 | 0×06 |
|---|---|---|---|
| - - | B0 | G0 | R0 |
| - - | B1 | G1 | R1 |
| - - | B2 | G2 | R2 |
| VERTEX 0 | | NORMAL 0 | |
| VERTEX 1 | | NORMAL 1 | |
| VERTEX 2 | | NORMAL 2 | |

FIG.38D

FLAT,TEXTURE

| 0×24 | 0×00 | 0×05 | 0×07 |
|---|---|---|---|
| CBA | | V0 | U0 |
| TSB | | V1 | U1 |
| - - | - - | V2 | U2 |
| VERTEX 0 | | NORMAL 0 | |
| VERTEX 2 | | VERTEX 1 | |

FIG.38E

GOURAUD,TEXTURE   REGION

| 0×30 | 0×00 | 0×06 | 0×09 | 0 |
|---|---|---|---|---|
| CBA | | V0 | U0 | 1 |
| TSB | | V1 | U1 | 2 |
| - - | - - | V2 | U2 | 3 |
| VERTEX 0 | | NORMAL 0 | | 4 |
| VERTEX 1 | | NORMAL 1 | | 5 |
| VERTEX 2 | | NORMAL 2 | | 6 |

FIG.38F

FLAT,NO-TEXTURE

| 0×21 | 0×01 | 0×03 | 0×04 |
|---|---|---|---|
| -- | B | G | R |
| VERTEX 1 | | VERTEX 0 | |
| -- | | VERTEX 2 | |

GOURAUD,NO-TEXTURE (GRADATION)

| 0×31 | 0×01 | 0×05 | 0×06 |
|---|---|---|---|
| -- | B0 | G0 | R0 |
| -- | B1 | G1 | R1 |
| -- | B2 | G2 | R2 |
| VERTEX 1 | | VERTEX 0 | |
| -- | | VERTEX 2 | |

FLAT,TEXTURE

| 0×25 | 0×01 | 0×06 | 0×07 |
|---|---|---|---|
| CBA | | V0 | U0 |
| TSB | | V1 | U1 |
| -- | -- | V2 | U2 |
| -- | B | G | R |
| VERTEX 1 | | VERTEX 0 | |
| -- | | VERTEX 2 | |

GOURAUD,TEXTURE (GRADATION)

| 0×35 | 0×01 | 0×08 | 0×09 |
|---|---|---|---|
| CBA | | V0 | U0 |
| TSB | | V1 | U1 |
| -- | -- | V2 | U2 |
| -- | B0 | G0 | R0 |
| -- | B1 | G1 | R1 |
| -- | B2 | G2 | R2 |
| VERTEX 1 | | VERTEX 0 | |
| -- | | VERTEX 2 | |

FLAT,NO-TEXTURE

| 0x28 | 0x00 | 0x04 | 0x05 |
|---|---|---|---|
| -- | B | G | R |
| VERTEX 0 | | NORMAL 0 | |
| VERTEX 2 | | VERTEX 1 | |
| -- | | VERTEX 3 | |

FIG.41A

GOURAUD,NO-TEXTURE

| 0x38 | 0x00 | 0x05 | 0x08 |
|---|---|---|---|
| -- | B | G | R |
| VERTEX 0 | | NORMAL 0 | |
| VERTEX 1 | | NORMAL 1 | |
| VERTEX 2 | | NORMAL 2 | |
| VERTEX 3 | | NORMAL 3 | |

FIG.41B

FLAT,NO-TEXTURE (GRADATION)

| 0x28 | 0x04 | 0x07 | 0x08 |
|---|---|---|---|
| -- | B0 | G0 | R0 |
| -- | B1 | G1 | R1 |
| -- | B2 | G2 | R2 |
| -- | B3 | G3 | R3 |
| VERTEX 0 | | NORMAL 0 | |
| VERTEX 2 | | VERTEX 1 | |
| -- | | VERTEX 3 | |

FIG.41C

GOURAUD,NO-TEXTURE (GRADATION)

| 0x38 | 0x04 | 0x08 | 0x08 |
|---|---|---|---|
| -- | B0 | G0 | R0 |
| -- | B1 | G1 | R1 |
| -- | B2 | G2 | R2 |
| -- | B3 | G3 | R3 |
| VERTEX 0 | | NORMAL 0 | |
| VERTEX 1 | | NORMAL 1 | |
| VERTEX 2 | | NORMAL 2 | |
| VERTEX 3 | | NORMAL 3 | |

FIG.41D

FLAT,TEXTURE

| 0x2c | 0x00 | 0x07 | 0x09 |
|---|---|---|---|
| CBA | | V0 | U0 |
| TSB | | V1 | U1 |
| -- | -- | V2 | U2 |
| -- | -- | V3 | U3 |
| VERTEX 0 | | NORMAL 0 | |
| VERTEX 2 | | VERTEX 1 | |
| -- | | VERTEX 3 | |

FIG.41E

GOURAUD,TEXTURE

| 0x3c | 0x00 | 0x08 | 0x0c |
|---|---|---|---|
| CBA | | V0 | U0 |
| TSB | | V1 | U1 |
| -- | -- | V2 | U2 |
| -- | -- | V3 | U3 |
| VERTEX 0 | | NORMAL 0 | |
| VERTEX 1 | | NORMAL 1 | |
| VERTEX 2 | | NORMAL 2 | |
| VERTEX 3 | | NORMAL 3 | |

FIG.41F

FLAT,NO-TEXTURE

| 0×29 | 0×01 | 0×03 | 0×05 |
|---|---|---|---|
| -- | B | G | R |
| VERTEX 1 | | VERTEX 0 | |
| VERTEX 3 | | VERTEX 2 | |

FIG.42A

GOURAUD,NO-TEXTURE (GRADATION)

| 0×31 | 0×01 | 0×05 | 0×06 |
|---|---|---|---|
| -- | B0 | G0 | R0 |
| -- | B1 | G1 | R1 |
| -- | B2 | G2 | R2 |
| -- | B3 | G3 | R3 |
| VERTEX 1 | | VERTEX 0 | |
| VERTEX 3 | | VERTEX 2 | |

FIG.42B

FLAT,TEXTURE

| 0×2d | 0×01 | 0×07 | 0×09 |
|---|---|---|---|
| CBA | | V0 | U0 |
| TSB | | V1 | U1 |
| -- | -- | V2 | U2 |
| -- | -- | V3 | U3 |
| -- | B | G | R |
| VERTEX 1 | | VERTEX 0 | |
| VERTEX 3 | | VERTEX 2 | |

FIG.42C

GOURAUD,TEXTURE (GRADATION)

| 0×35 | 0×01 | 0×08 | 0×09 |
|---|---|---|---|
| CBA | | V0 | U0 |
| TSB | | V1 | U1 |
| -- | -- | V2 | U2 |
| -- | -- | V3 | U3 |
| -- | B0 | G0 | R0 |
| -- | B1 | G1 | R1 |
| -- | B2 | G2 | R2 |
| -- | B3 | G3 | R3 |
| VERTEX 1 | | VERTEX 0 | |
| VERTEX 3 | | VERTEX 2 | |

FIG.42D

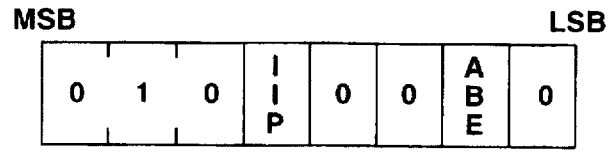
FIG.43
| GRADATION OFF | | | |
|---|---|---|---|
| 0x40 | 0x01 | 0x02 | 0x03 |
| -- | B | G | R |
| VERTEX 1 | | VERTEX 0 | |
FIG.44A
| GRADATION ON | | | |
|---|---|---|---|
| 0x50 | 0x01 | 0x03 | 0x04 |
| -- | B0 | G0 | R0 |
| -- | B1 | G1 | R1 |
| -- | B2 | G2 | R2 |
| VERTEX 1 | | VERTEX 0 | |
FIG.44B
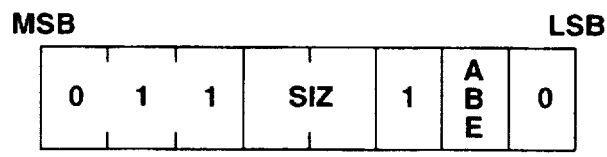
FIG.45

FREE SIZE

| 0x64 | 0x01 | 0x03 | 0x05 |
|---|---|---|---|
| TSB | | VERTEX 0 | |
| CBA | | V0 | U0 |
| H | | W | |

| 0x6c | 0x01 | 0x02 | 0x04 |
|---|---|---|---|
| TSB | | VERTEX 0 | |
| CBA | | V0 | U0 |

| 0x74 | 0x01 | 0x02 | 0x04 |
|---|---|---|---|
| TSB | | VERTEX 0 | |
| CBA | | V0 | U0 |

| 0x7c | 0x01 | 0x02 | 0x04 |
|---|---|---|---|
| TSB | | VERTEX 0 | |
| CBA | | V0 | U0 |

FIG.46D

| TYPE | NPACKET |
|---|---|
| POLYGON DATA #0 ||
| POLYGON DATA #1 ||
| POLYGON DATA #2 ||
| ⋮ ||

FIG.50

| PACKET DATA_0 |
|---|
| PACKET DATA_1 |
| LOCATION OF VERTEX (VX0,VY0,VZ0) |
| LOCATION OF VERTEX (VX1,VY1,VZ1) |
| LOCATION OF VERTEX (VX2,VY2,VZ2) |

FIG.51

| TAG | | | |
|---|---|---|---|
| CODE | B0 | G0 | R0 |
| Y0 | | X0 | |
| | | V0 | U0 |
| | B1 | G1 | R1 |
| Y1 | | X1 | |
| | | V1 | U1 |
| | B2 | G2 | R2 |
| Y2 | | X2 | |
| | | V2 | U2 |

FIG.52

| TYPE OF POLYGON |
|---|
| ATTRIBUTE OF POLYGON |
| COLOR OF POLYGON |
| LOCATION OF VERTEX (VX0,VY0,VZ0) |
| LOCATION OF VERTEX (VX1,VY1,VZ1) |
| LOCATION OF VERTEX (VX2,VY2,VZ2) |
| NORMAL VECTOR (VX0,VY0,VZ0) |
| NORMAL VECTOR (VX1,VY1,VZ1) |
| NORMAL VECTOR (VX2,VY2,VZ2) |
| TEXTURE COORDINATES (U0,V0) |
| TEXTURE COORDINATES (U1,V1) |
| TEXTURE COORDINATES (U2,V2) |

FIG.56 (PRIOR ART)

| CODE | B0 | G0 | R0 | REGION 0 |
|---|---|---|---|---|
|  | Y0 |  | X0 | 1 |
|  |  | V0 | U0 | 2 |
|  | B1 | G1 | R1 | 3 |
|  | Y1 |  | X1 | 4 |
|  |  | V1 | U1 | 5 |
|  | B2 | G2 | R2 | 6 |
|  | Y2 |  | X2 | 7 |
|  |  | V2 | U2 | 8 |

FIG.57 (PRIOR ART)

METHOD OF PRODUCING IMAGE DATA, IMAGE DATA PROCESSING APPARATUS, AND RECORDING MEDIUM

This application claims priority under the International Convention based upon Japanese Patent Application No. P06-300020 filed Dec. 2, 1994.

BACKGROUND OF THE INVENTION

The present invention relates generally to image data processing and, more particularly, to improvements in methods and apparatus for producing enhanced image data by data processing and to a recording medium carrying such image data.

It is common practice in the prior art that images produced on a television receiver, a monitor or a CRT display of a home video-game machine, a micro-computer, or a graphic computer are substantially two-dimensional. Such images are usually animated by moving and varying a two-dimensional character or object on a planar two-dimensional background. However, such two-dimensional images or pictures are limited in both the modeling of a background and the movement of character objects, thus failing to yield more realistic images, particularly in a video game.

For improvement, various methods of making highly realistic three-dimensional images or pictures have been proposed and some of them are described below. One of various predetermined movements of a character object viewed from several directions may be selected and displayed according to visual variation, such as a change in the viewpoint in the image. Also, a simulated three-dimensional image may be created by overlapping a plurality of two-dimensional graphics, one over the other, in a depthwise direction. A texture mapping method may also be provided in which the surfaces of a polygon are filled with a texture map (of material or pattern) to generate an image model. In another method, a variation of colors is produced by changing color data of the image with the use of a color lookup table.

In a typical example of a prior art home video-game machine, manipulation information is introduced from an input device, such as an entry pad or a joy stick, and is passed across an interface along a main bus by the action of a CPU consisting mainly of a microprocessor. Upon introduction of the manipulation data, three-dimensional data stored in a main memory is transmitted by the action of a video processor to a source video memory for temporary storage.

The aforementioned CPU also operates to transfer to the video processor a specific sequence for reading out a series of image data segments from the source video memory for overlapping them, one over the other, on the screen. According to the reading sequence of the image data segments, the video processor reads the image data segments from the source video memory and displays them in their overlapped arrangement.

While the image data segments are being read and displayed, audio components of the manipulation information are fed to an audio processor which, in turn, picks up corresponding audio data from an audio memory for synchronization with the image data.

For example, the source video memory may hold a background of a checker-board pattern and a group of rectangular image segments or sprites representing cross sections of a cylindrical object in the background. Other areas besides the cross sections of the cylindrical object on the sprites may be drawn in transparency.

A sync generator mounted in the video processor generates a read address signal in response to a sync signal of the image data. The read address signal of the sync generator is transmitted via the main bus to a read address table determined by the CPU. The sync generator also reads the image segments from the source video memory in response to a signal from the read address table.

The video data segments retrieved are then fed to an overlap processor where they are overlapped, one over the other, in the sequence determined by a priority table and passed via the main bus from the CPU. Since the background comes the first and is then followed by the rectangle sprites, the group of sprites being placed in superposition, one over the other, on the background.

Then, the other areas in addition to the cross sections of the cylindrical object of the aforementioned sprites, which are overlapped one over the other on the background, are rendered to transparency by a suitable transparency processor. As a result, the two-dimensional image data of the cylindrical object can be reproduced as three-dimensional data VDO of the original image.

However, it is necessary for production of a new file of a given format to convert the original data to its desired form and, then, to format the desired form of the original data to the new file.

A processing method for converting the original data to a given format includes processing of geometrical data of an object or original data to produce its three-dimensional graphic data capable of being displayed on a two-dimensional screen from the given format, as is applicable to any home video-game machine.

Such a method includes a sequence of image data processing (referred to hereinafter as three-dimensional graphic processing) in which the three-dimensional graphic data of an original geometric object is produced for display on a two-dimensional screen and which allows the original geometric data of the object supplied to a terminal to be processed by a coordinate transforming device for producing a packet of data of a given format which is then transmitted to a rendering device for drawing.

The original geometric data is composed of a group of polygons (which are unit shapes of graphics, including triangles, quadrilaterals, and other shapes, and handled with a drawing apparatus) and is expressed as a three-dimensional model on a display. Each polygon data includes the type of polygon (triangle, quadrilateral, or the like), an attribute of the polygon (transparent or semitransparent), a color of the polygon, three-dimensional coordinates representing vertices, three-dimensional vectors representing the normal across a vertex, and two-dimensional coordinates representing a storage location of texture data. These are known file formats containing two or more of the geometric data.

The packet data of the format produced by the processing action of the coordinate transforming device carries information for drawing a polygon on the screen of a display, including the type of the polygon (triangle, quadrilateral, or the like), an attribute of the polygon (transparent or semitransparent), two-dimensional coordinates representing vertices, a color of a vertex, and two-dimensional coordinates representing a storage location of a texture data. FIG. 57 shows a typical format of an ordinary file containing a series of the packet data. For example, CODE is a code representing a type (polygon, line, sprite, or the like) of contents, V and U represent X and Y coordinate values, respectively, in the texture source space, R, G, and B are R, G, and B values of the three primary colors of a polygon, and X and Y are X and Y coordinate values, respectively, indicating vertices of the polygon. The contents and length of the packet data are varied depending on the shape and size of the polygon.

In order to convert the existing file of the format described above to a file of a new and improved format, the following steps of a process would have to be carried out at the coordinate transforming device:

1. The size of a desired packet of data for each shape of the polygons is calculated and stored in a given area of an applicable memory.
2. The following procedure is then repeated for each polygon:
   (1) The type and attribute of the polygon are combined together to form one word and is written into a region 0 of the packet data.
   (2) The color of a vertex is determined from the normal of the vertex and the color of the polygon and is written into a region 0 and two regions 3 and 6 of the packet data.
   (3) Two-dimensional coordinates are calculated from three-dimensional coordinates of the vertex and are written into regions 1, 4, and 7 of the packet data.
   (4) Two-dimensional coordinates of a texture are then written into regions 2, 5, and 8 of the packet data.

As indicated, at least these three steps are required for producing a new file (packet data file) of the image data from an original file (object shape data file):

1. A memory area is preserved for producing a new file.
2. Data in an original file is formatted and stored.
3. Data calculated from the original file data is stored in a new format.

The aforementioned steps, 1-3, are costly in time and labor.

Accordingly, there has been a long existing need for enhanced image data processing in which a file containing original image data to be transformed is easily converted into a new format, for an image data processing apparatus for processing such image data and a recording medium for carrying such enhanced image data. The present invention fulfills these needs.

SUMMARY OF THE INVENTION

Briefly, and in general terms, the present invention provides a new and improved method and apparatus for producing image data, in which a file containing original image data to be transformed is easily converted into a new format, for an image data processing apparatus for processing such image data and a recording medium for carrying such enhanced image data.

By way of example, and not necessarily by way of limitation, an image data producing method, in accordance with the present invention, is provided for converting a three-dimensional image data by perspective view transformation into two-dimensional image data and transferring the two-dimensional image data in a given transmission standard to draw an image on a two-dimensional display screen. In particular, the method includes a structure of the three-dimensional image data, excluding the information to be perspective view transformed, arranged identical to that of the given transmission standard of the two-dimensional image data. The three-dimensional image data may include information about shading on an object to be drawn on the two-dimensional display screen. The structures of the thee-dimensional image data and the two-dimensional image data may be identical to each other in a minimum unit of one or more words. The three-dimensional image data may include all the contents of the two-dimensional data.

Similarly, an image data processing apparatus, in accordance with the present invention, includes a coordinate transforming means for converting three-dimensional image data by perspective view transformation into two-dimensional image data, and a drawing means for transferring the two-dimensional image data in a given transmission standard for drawing an image on a two-dimensional display screen, in which a structure of the three-dimensional image data excluding the information to be perspective view transformed is arranged identical to that of the given transmission standard of the two-dimensional image data. The coordinate transforming means is operated so that the information to be perspective view transformed is discriminated from the other data of the three-dimensional image data of which the structure is identical to that of the given transmission standard of the two-dimensional image data, subjected to the perspective view transformation, and combined with the other data, which the structure is identical to that of the given transmission standard, for production of the two-dimensional image data. As previously indicated, such three-dimensional image data may include information about shading on an object to be drawn on the two-dimensional display screen.

A recording medium, in accordance with the present invention, is provided for holding image data created by the aforedescribed method and apparatus of the invention.

Since the structure of the three-dimensional image data, excluding the information to be perspective view transformed, is identical to that of the given transmission standard of the two-dimensional image data, the two-dimensional image data of the given transmission standard can be obtained by simply processing the information to be perspective view transformed.

In addition, since the three-dimensional image data includes information about shading on an object to be drawn on the two-dimensional display screen, no additional calculation for generating data of the shading on the object will be needed during the production of the two-dimensional image data.

Hence, the present invention satisfies a long existing need for enhanced image data processing in which a file containing original image data to be transformed is easily converted into a new format, for an image data processing apparatus for processing such image data and a recording medium for carrying such enhanced image data.

These and other objects and advantages of the invention will become apparent from the following more detailed description, when taken in conjunction with the accompanying drawings of illustrative embodiments.

DESCRIPTION OF THE DRAWINGS

FIGS. 15A–15G are diagrams illustrating the structure of "packet data" of the coordinate (RST) type;

FIG. 16 is a diagram illustrating the structure of "packet data" of TMD data of the ID type;

FIG. 17 is a diagram illustrating the structure of "packet data" of the host object ID type;

FIG. 18 is a diagram illustrating the structure of "packet data" of the matrix type;

FIG. 19 is a diagram illustrating the structure of a "flag" of the light source type;

FIGS. 20A–20C are diagrams illustrating the structure of "packet data" of the light source type;

FIGS. 21A–21B are diagrams illustrating the structure of a "flag" of the camera type;

FIG. 22 is a diagram illustrating the assignment of other bits when "camera type" is 0;

FIG. 23 is a diagram illustrating the assignment of other bits when "camera type" is 1;

FIGS 24A–24C are diagrams illustrating a first structure of "packet data" of the camera type;

FIGS. 25A–25C are diagrams illustrating a second structure of "packet data" of the camera type;

FIG. 33 is a diagram showing the structure of a NORMAL of the TMD format;

FIG. 34 is a diagram showing the format of a fixed decimal point fraction;

FIG. 35 is a diagram showing the structure of the TBS parameter in "packet data" of a PRIMITIVE;

FIGS. 38A–38F are diagrams illustrating the structure of "packet data" of a PRIMITIVE with the application of the triangle polygon and light source calculation;

FIGS. 41A–41F are diagrams illustrating the structure of "packet data" of a PRIMITIVE with the application of the quadrilateral polygon and light source calculation;

FIGS. 42A–42D are diagrams illustrating the structure of "packet data" of a PRIMITIVE with the application of the quadrilateral polygon, but without light source calculation;

FIG. 43 is a diagram of bit assignment of "mode" of a line drawing, showing a modification of "packet data" of a PRIMITIVE;

FIGS. 44A–44B are diagrams of a structure of "packet data" of a line drawing, showing a modification of "packet data" of a PRIMITIVE;

FIG. 45 is a diagram of bit assignment of "mode" of a three-dimensional sprite drawing, showing a modification of "packet data" of a PRIMITIVE;

FIGS. 46A–46D are diagrams of a structure of "packet data" of a three-dimensional sprite drawing, showing a modification of "packet data" of a PRIMITIVE;

FIG. 50 is a diagram of another embodiment of a TMD format;

FIG. 51 is a diagram showing the structure of the "Polygon data" in the TMD format for the embodiment of FIG. 50;

FIG. 52 is a diagram showing the structure of "packet data" for a further embodiment;

FIG. 56 is a diagram showing the structure of a conventional file for object shape data; and FIG. 57 is a diagram showing the structure of a conventional file for "packet data".

DESCRIPTION OF THE PREFERRED EMBODIMENTS

Figure 1:
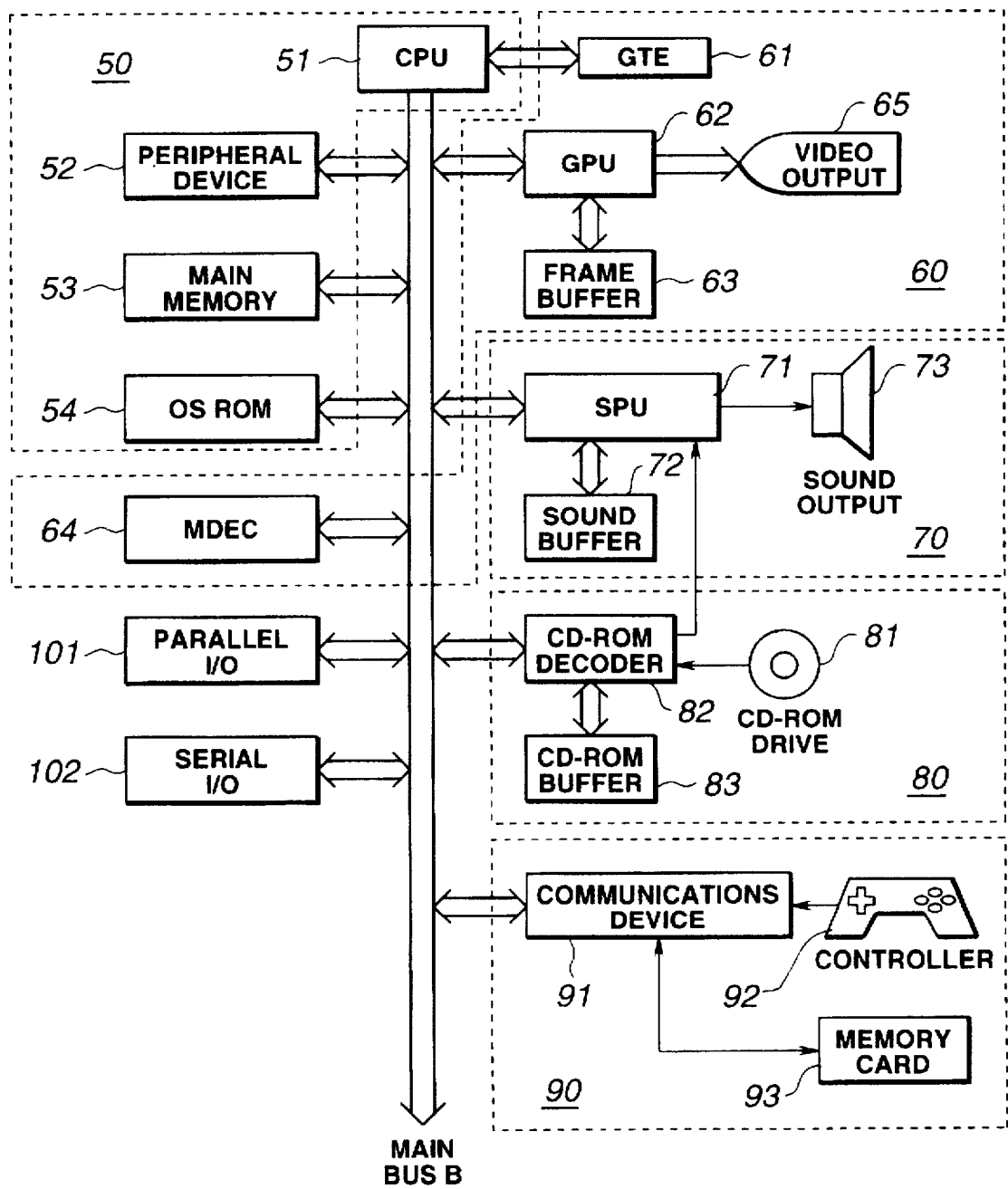
FIG. 1 is a block diagram of the overall system arrangement of an image data processing apparatus, in accordance with the present invention.

Referring now to the drawings, like reference numerals denote like or corresponding parts throughout the drawing figures.

Figure 53:
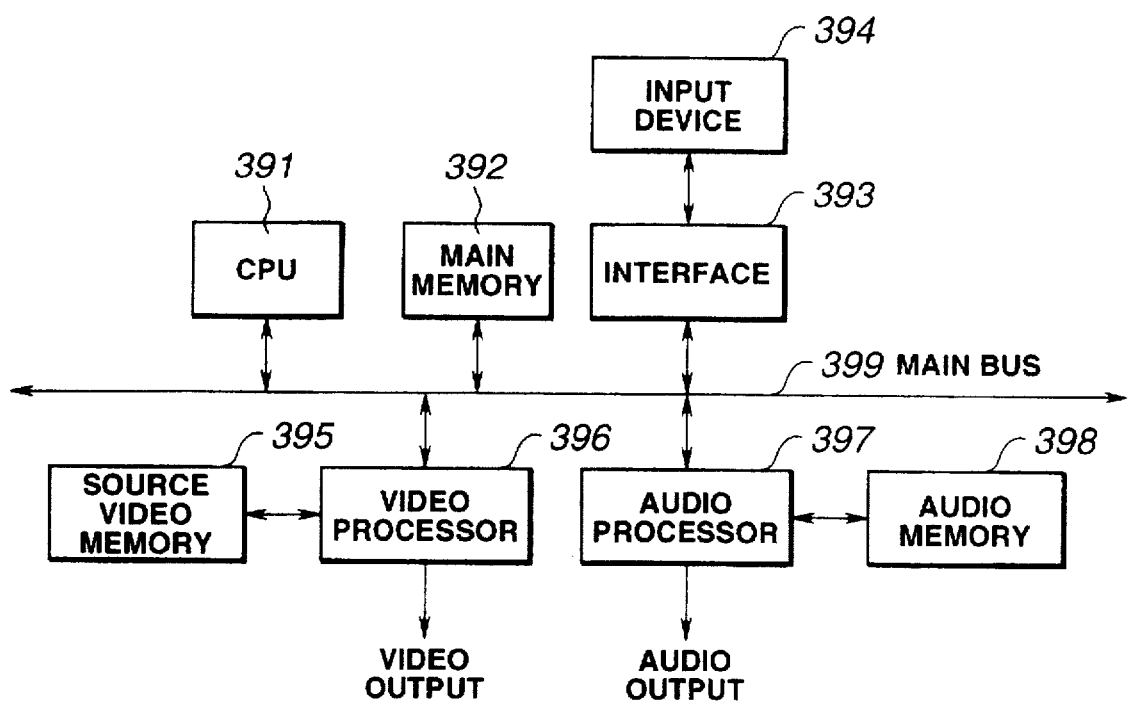
FIG. 53 is a block diagram illustrating a system arrangement of a prior art image producing apparatus (or home video-game machine)

A typical example of a prior art home video-game machine is illustrated in FIG. 53. As shown in FIG. 53.

manipulation information introduced from an input device 394 such as an entry pad or a joy stick is passed across an interface 393 and introduced along a main bus 399 by the action of a CPU 391 consisting mainly of a microprocessor. As previously indicated, upon introduction of the manipulation data, a three-dimensional data stored in a main memory 392 is transmitted by the action of a video processor 396 to a source video memory 395 for temporal storage.

The CPU 391 also operates to transfer to the video processor 396 a specific sequence for reading out a series of image data segments from the source video memory 395 for overlapping them one over the other in the screen. According to the sequence of reading the image data segments, the video processor 396 reads the image data segments from the source video memory 395 and displays them in their overlap arrangement.

While the image data segments are being read and displayed, audio components of the manipulation information are fed to an audio processor 397 which, in turn, picks up corresponding audio data from an audio memory 398 for synchronization with the image data.

Figure 54:
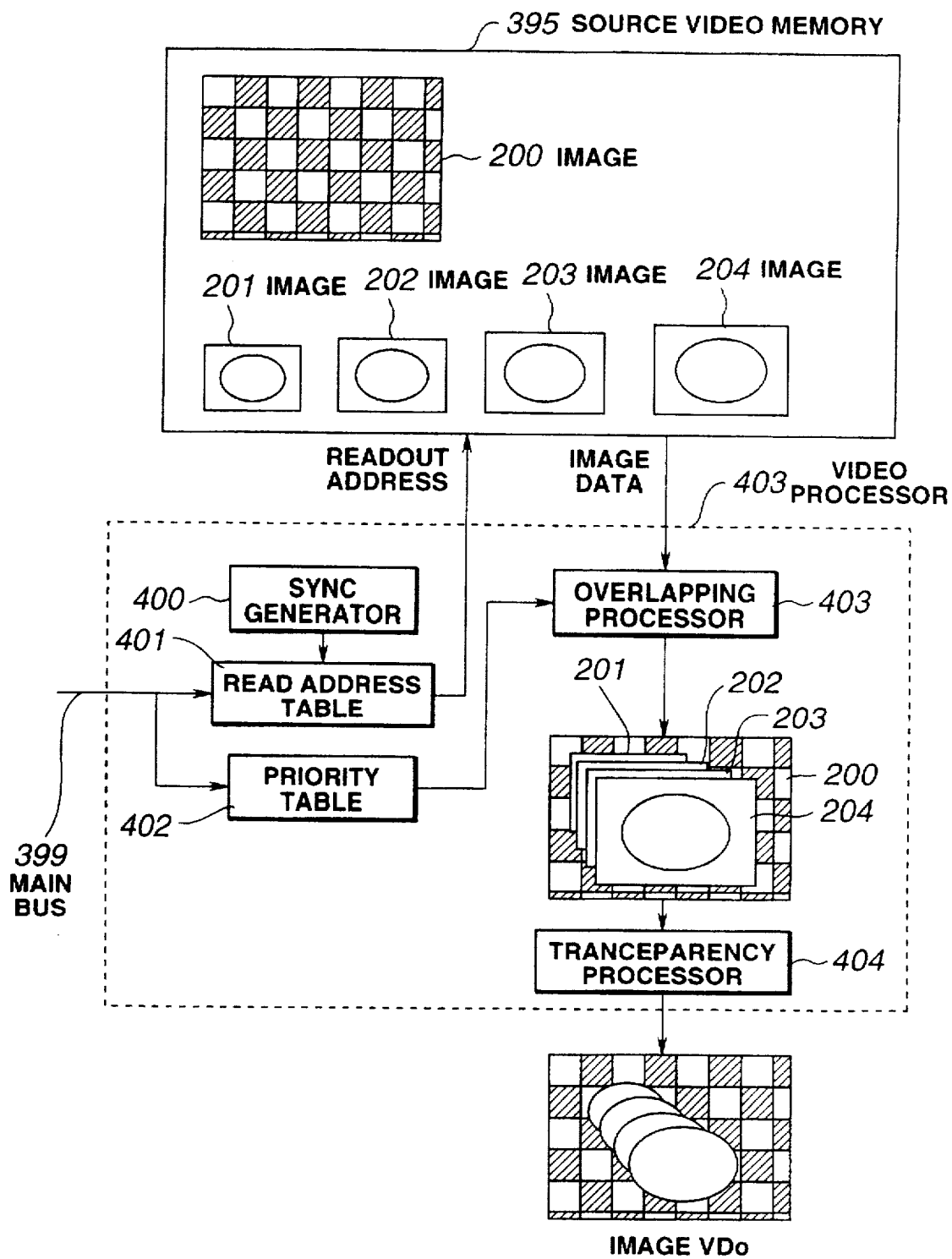
FIG. 54 is a combined block and schematic diagram illustrating an image producing method as carried out by the prior art image producing apparatus.

As best observed in FIG. 54, there is shown a procedure of delivering a three-dimensional data on the basis of a two-dimensional data format in the home video-game machine illustrated in FIG. 53. FIG. 54 illustrates display of a cylindrical object on the background of a checker-board pattern in a three-dimensional image.

The source video memory 395 of FIG. 54 holds a background 200 of a checker-board pattern and a group of rectangle image segments or sprites 201, 202, 203, and 204 representing cross sections of the cylindrical object on the background 200. Other areas than the cross sections of the cylindrical object on the sprites 201, 202, 203, and 204 are drawn in transparency.

A sync generator 400 mounted in the video processor 396 is used to generate a read address signal in response to a sync signal of the image data. The read address signal of the sync generator 400 is transmitted via the main bus 399 to a read address table 401 determined by the CPU 391 shown in FIG. 53. The sync generator 400 also reads the image segments from the source video memory 395 in response to a signal from the read address table 401.

The video data segments retrieved are then fed to an overlap processor 403 where they are overlapped, one over the other, in the sequence determined by a priority table 402 and passed via the main bus 399 from the CPU 391. As the background 200 comes first, and is then followed by the rectangle sprites 201, 202, 203, and 204 in that order, the group of sprites are placed, one over the other, on the background 200.

Then, the other areas in addition to the cross sections of the cylindrical object of the sprites 201, 202, 203, and 204 which are overlapped, one over the other, on the background are rendered to transparency by a transparency processor 404.

As a result, the two-dimensional image data of the cylindrical object can be reproduced as three-dimensional data VDO of the original image as shown in FIG. 54.

However, as previously indicated, it is necessary for production of a new file of a given format to convert the original data to its desired form and, then, to format the desired form of the original data to the new file.

A processing method for converting the original data to a given format includes processing of geometrical data of an object or original data to produce its three-dimensional graphic data capable of being displayed on a two-dimensional screen from the given format, as is applicable to any home video-game machine.

Figure 55:
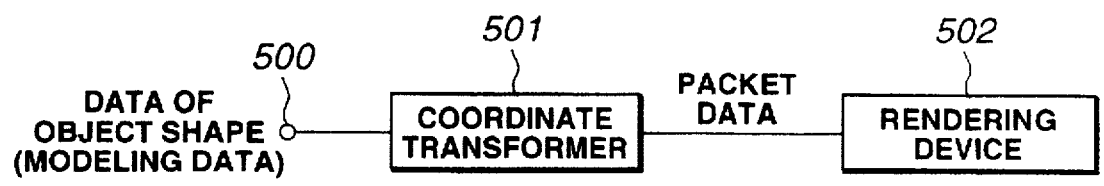
FIG. 55 is a block diagram showing an arrangement of a prior art image data processing system.

As illustrated in FIG. 55, such a method includes a sequence of image data processing (referred to hereinafter as three-dimensional graphic processing) in which the three-dimensional graphic data of an original geometric object is produced for display on a two-dimensional screen. The system shown in FIG. 55 allows the original geometric data of the object supplied to a terminal 500 to be processed by a coordinate transforming device 501 for producing a packet of data of a given format which is then transmitted to a rendering device 502 for drawing.

The original geometric data is composed of a group of polygons (which are unit shapes of graphics, including triangles, quadrilaterals, and other shapes, and handled with a drawing apparatus) and is expressed as a three-dimensional model on a display. Each polygon data includes the type of polygon (triangle, quadrilateral, or the like), an attribute of the polygon (transparent or semitransparent), a color of the polygon, three-dimensional coordinates representing vertices, three-dimensional vectors representing the normal across a vertex, and two-dimensional coordinates representing a storage location of texture data. FIG. 56 illustrates these known file formats containing two or more of the geometric data.

The packet data of the format produced by the processing action of the coordinate transforming device 501 carries information for drawing a polygon on the screen of a display, including the type of the polygon (triangle, quadrilateral, or the like), an attribute of the polygon (transparent or semitransparent), two-dimensional coordinates representing vertices, a color of a vertex, and two-dimensional coordinates representing a storage location of a texture data. FIG. 57 shows a typical format of an ordinary file contains a series of the packet data. As shown in FIG. 57, CODE is a code representing a type (polygon, line, sprite, or the like) of contents, V and U represent X and Y coordinate values, respectively, in the texture source space, R, G, and B are R, G, and B values of the three primary colors of a polygon, and X and Y are X and Y coordinate values, respectively, indicating vertices of the polygon. The contents and length of the packet data are varied depending on the shape and size of the polygon.

In order to convert the existing file of the format shown in FIG. 56 to a file of a new and improved format as shown in FIG. 57, the following steps of a process would have to be carried out at the coordinate transforming device 501:

1. The size of a desired packet of data for each shape of the polygons is calculated and stored in a given area of an applicable memory.
2. The following procedure is then repeated for each polygon:
    (1) The type and attribute of the polygon are combined together to form one word and is written into a region 0 of the packet data.
    (2) The color of a vertex is determined from the normal of the vertex and the color of the polygon and is written into a region 0 and two regions 3 and 6 of the packet data.
    (3) Two-dimensional coordinates are calculated from three-dimensional coordinates of the vertex and are written into regions 1, 4, and 7 of the packet data.
    (4) Two-dimensional coordinates of a texture are then written into regions 2, 5, and 8 of the packet data.

As indicated, at least these three steps are required for producing a new file (packet data file) of the image data from an original file (object shape data file):

1. A memory area is preserved for producing a new file.
2. Data in an original file is formatted and stored.
3. Data calculated from the original file data is stored in a new format.

The aforementioned steps, 1–3, are costly in time and labor and, hence, the need exists for enhanced data processing efficiency.

Prior to the description of a primary embodiment of the present invention in the form of a method of producing image data, an image processing system of another embodiment of the present invention for generating a three-dimensional graphic data from the image data produced by the image data processing method of the present invention will be explained to enhance the subsequent understanding of the primary embodiment.

Referring now to the drawings, FIG. 1 shows an arrangement of the image processing system installed in a home video-game machine. The image processing system is substantially designed for use in a home video-game machine, a microcomputer, or a graphic computer apparatus device.

The image processing system of the embodiment of FIG. 1 allows an operator to play a game by controlling relevant data (e.g., game programs) retrieved from a recording medium such as an optical disk (e.g., a CD-ROM) which is also designed by the present invention for storage of the data in a specific format.

More specifically, the image processing system of the embodiment shown in FIG. 1 comprises a main controller module 50 composed of a central processing unit (CPU) 51 and its peripheral devices (including a peripheral device controller 52), a graphic module 60 composed substantially of a graphic processing unit (GPU) 62 for drawing an image on a frame buffer 63, a sound module 70 composed of a sound processing unit (SPU) 71 and other devices for emitting a music or effect sound, an optical disk controller module 80 for controlling an optical (CD-ROM) disk drive 81 which acts as an auxiliary memory means and decoding of reproduced data, a communications controller module 90 for controlling entry of command signals from a controller 92, input and output of information on game parameter setting on a sub memory (or a memory card) 93, and a main bus B connected from the main control module 50 to the communications controller module 90.

The main controller module 50 comprises the CPU 51, the peripheral device controller 52 for controlling interrupt actions, time sequences, memory actions, and transmission of a direct memory access (DMA) signal, a main memory 53 composed of, e.g., 2-megabytes of RAM, and a ROM 54 of, for example, 512 kilobytes, in which programs, including an operating system for operating the main memory 53, graphic module 60, and sound module 70, are stored.

The CPU 51 may be a 32-bit reduced instruction set computer (RISC) for performing the operating system stored in the ROM 54 to control the entire system. The CPU 51 also includes a command cache and a scratch pad memory for controlling real storage.

The graphic module 60 comprises a GTE 61 consisting of a coprocessor for coordinate calculation to perform a coordinate transform process, the GPU 62 for drawing an image in response to command signals from the CPU 51, the frame buffer 63 has, e.g., one megabyte for storage of graphic data provided by the GPU 62, and an image decoder 64 (referred to as "MDEC" hereinafter) for decoding a coded image data compressed and encoded by an orthogonal transform process such as discrete cosine transforming.

The GTE 61 may have a parallel processor for performing a plurality of arithmetic operations in parallel and acts as a coprocessor for the CPU 51 to operate high-speed actions for coordinate transforming and calculation of light source, vector, and matrix of fixed decimal point notation.

More specifically, the GTE 61 is capable of performing the coordinate calculation of polygons at typically 1.5 million per second for flat shading where each triangle polygon is drawn in one single color. This allows the image processing system to minimize the load to the CPU 51 and thus perform the coordinate calculations at a higher speed.

The GPU 62 is responsive to a polygon drawing command from the CPU 51 for drawing a polygon or graphic to the frame buffer 63. The GPU 62 can draw up to 360,000 polygons per second and also, has a two-dimensional address space independently of the CPU 51 for mapping of the frame buffer 63.

The frame buffer 63 comprises a so-called dual port RAM which performs at the same time a retrieving of drawing data from the GPU 62 or a transfer of data from the main memory 53 and a releasing of data for display.

Also, the frame buffer 63 may have a size of one megabyte constituting a pixel matrix of 1024 in horizontal by 512 in vertical in 16-bit format. Any desired area in the size of the frame buffer 63 can be delivered to a video output means 65 such as a display.

In addition to the area delivered as a video output, the frame buffer 63 includes a color lookup table (referred to as "CLUT" hereinafter) area for storage of a CLUT which is used as a reference during drawing of graphics or polygons with the action of the GPU 62 and a texture area for storage of texture data to be coordinate transformed and mapped on the graphics or polygons drawn by the GPU 62. Both the CLUT and texture areas can be varied dynamically depending on a change of the display area. The frame buffer 63 can thus execute a drawing access to the area on display and a high-speed DMA transfer to and from the main memory 53.

The GPU 62 can also perform, in addition to the flat shading, Gouraud shading in which the color of a polygon is determined by interpolation of vertex color, and texture mapping in which a texture selected from the texture area is attached to a polygon.

For the Gouraud shading or texture mapping, the GTE 61 can perform the coordinate calculation at a rate of up to 500,000 polygons per second.

The MDEC 64 is responsive to a command signal from the CPU 51 for decoding a still or motion image data retrieved from a CD-ROM disk and stored in the main memory 53 and subsequently storing it again in the main memory 53. More particularly, the MDEC 64 performs a reverse discrete cosine transforming operation (referred to as reverse DCT) at a high speed for expanding compressed data of the color still image compression standard (known as JPEG) or the motion image encoding standard for storage media (known as MPEG, but for intraframe compression in this embodiment).

The image data reproduced is transferred via the GPU 62 to the frame buffer 63 and can therefore be used as a background for an image drawn by the GPU 62.

The sound module 70 comprises the sound processor unit (SPU) 71 responsive to a command from the CPU 51 for generating a music or effect sound, a sound buffer 72 having, by way of example and not necessarily by way of limitation, 512 kilobytes for storage of audio data of voice or music sound, sound source data retrieved from a CD-ROM, and a loud speaker 73 acting as a sound output means for emitting a music or effect sound generated with the SPU 71.

The SPU 71 has an adaptive differential pulse code modulation (ADPCM) signal decoding function for reproducing an audio data of 4-bit ADPCM format converted from a 16-bit audio data, a playback function for reproducing the sound source data stored in the sound buffer 72 to emit a music or effect sound, and a modulating function for modulating the audio data stored in the sound buffer 72 for playback. More specifically, the SPU 71 has an ADPCM sound source with 24-voices in which motion parameters of looping and time coefficients are automatically modified and which is actuated by a signal from the CPU 51. The SPU 71 controls its address space mapped with the sound buffer 72 and can perform the reproduction of audio data by direct transmission of ADPCM data with information of key-on/ key-off or modulation from the CPU 51 to the sound buffer 72.

Accordingly, the sound module 70 is used as a sampling sound source for generating a music or effect sound corresponding to the audio data stored in the sound buffer 72 upon receiving a command signal from the CPU 51.

The optical disk controller module 80 comprises the disk drive 81 for retrieving a program or data from an optical disk of CD-ROM, a decoder 82 for decoding an encoded, stored program or data accompanied with error correction codes (ECC), and a buffer 83 of, for example, 32 kilobytes for storage of data retrieved from an optical disk. The optical disk controller module 80 composed of the disk drive 81, decoder 82, and other components for reading data from a disk is also arranged to support other disk formats including CD-DA and CD-ROM XA. The decoder 82 also serves as a member of the sound module 70.

The audio data retrieved by the disk drive 81 from the disk is not limited to the ADPCM format (for storage on CD-ROM XA disks) but may be of a common PCM mode produced by analog-to-digital conversion.

The ADPCM data may be recorded in 4-bit differential form calculated from 16-bit digital data and is first subjected to error correction and decoding in the decoder 82, transmitted to the SPU 71 where it is D/A converted, and supplied to the loud speaker 73 for playback.

The PCM data may be recorded in 16-bit digital signal form and is decoded by the decoder 82 for driving the loud speaker 73. An audio output of the decoder 82 is first sent to the SPU 71 where it is mixed with an SPU output and released through a reverberation unit for audio playback.

The communications controller module 90 comprises a communications controller device 91 for controlling communications along the main bus B with the CPU 51, the controller 92 for entry of commands by an operator, and the memory card 93 for storage of game setting data.

The controller 92 is an interface for transmitting instructions of the operator to application software and may carry 16 command keys for entry of the instructions. Commands attributed to the keys as predetermined by the communications controller device 91 are fed to the communications controller device 91 in synchronous mode at a speed of 60 times per second. The communications controller device 91 then transmits the key commands to the CPU 51. The controller 92 has two connectors arranged thereon for connection of a number of the controllers one after another through multi-tap ports.

Accordingly, upon receiving the command from the operator, the CPU 51 starts performing a corresponding process action determined by a game program.

When the initial setting on a game to be played is requested, the CPU 51 transfers relevant data to the communications controller device 91 which, in turn, stores the data in the memory card 93.

The memory card 93 is separated from the main bus B and can freely be installed or removed while the main bus B is being energized. This will allow data of the game setting to be stored in two or more of the memory cards 93.

The system of this embodiment of the present invention is also provided with a 16-bit parallel input and output (I/O) port 101 and an asynchronous serial input and output (I/O) port 102. The system can be connected at the parallel I/O port 101 to any other peripheral device and at the serial I/O port 102 to another video game machine for communications.

Between the main memory 53, the GPU 62, the MDEC 64, and the decoder 82, it is required to transfer at a high speed huge amounts of the image data for reading a program, displaying a text, or drawing a graphic. The image processing system of this embodiment is thus adapted for allowing direct data transfer or DMA transfer between the main memory 53, the GPU 62, the MDEC 64, and the decoder 82 without using the CPU 51. Rather, it is under the control of the peripheral device controller 52. As a result, the load to the CPU 51 during the data transfer will be considerably reduced, thus ensuring high-speed data transfer operations.

The video game machine of the present invention allows the CPU 51 to execute the operating system stored in the OS ROM 54 upon being energized. As the operating system is executed, the actions of the graphic module 60 and the sound module 70 are correctly controlled by the CPU 51.

In addition, upon the operating system being invoked, the CPU 51 starts initializing the entire system by reviewing each action and then by actuating the optical disk controller module 80 for performing a desired game program stored on an optical disk.

During execution of the game program, the CPU 51 actuates the graphic module 60 and the sound module 70 in response to command inputs by the operator for controlling display of images and reproduction of music or effect sounds. The representation of image data on the display by the image data processing apparatus of the present invention is next explained.

Figure 2:
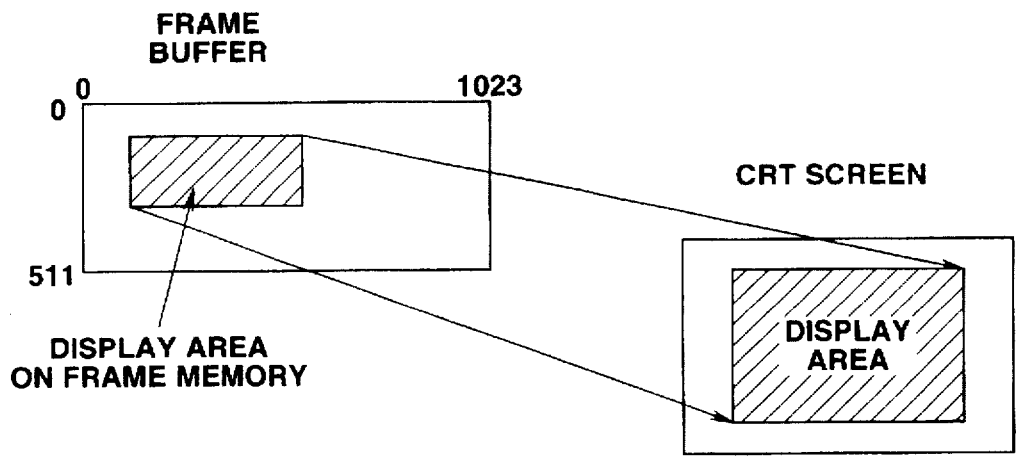
FIG. 2 is a diagram illustrating representation on a display.

The GPU 62 displays the area of a desired graphic model produced by the frame buffer 63 on the video output means 65 or display, e.g., such as a CRT. The area is referred to hereinafter as a display area. The relationship between the display area and the display screen is illustrated in FIG. 2.

The GPU 62 is designed to support ten different display modes which are shown below.

| Mode | Resolution | Remarks |
| --- | --- | --- |
| 0 | 256(H) × 240(V) | Non-interlaced |
| 1 | 320(H) × 240(V) | Non-interlaced |
| 2 | 512(H) × 240(V) | Non-interlaced |
| 3 | 640(H) × 240(V) | Non-interlaced |
| 4 | 256(H) × 480(V) | Interlaced |
| 5 | 320(H) × 480(V) | interlaced |
| 6 | 512(H) × 480(V) | Interlaced |
| 7 | 640(H) × 480(V) | Interlaced |
| 8 | 384(H) × 240(V) | Non-interlaced |
| 9 | 384(H) × 480(V) | Interlaced |

Figure 3:
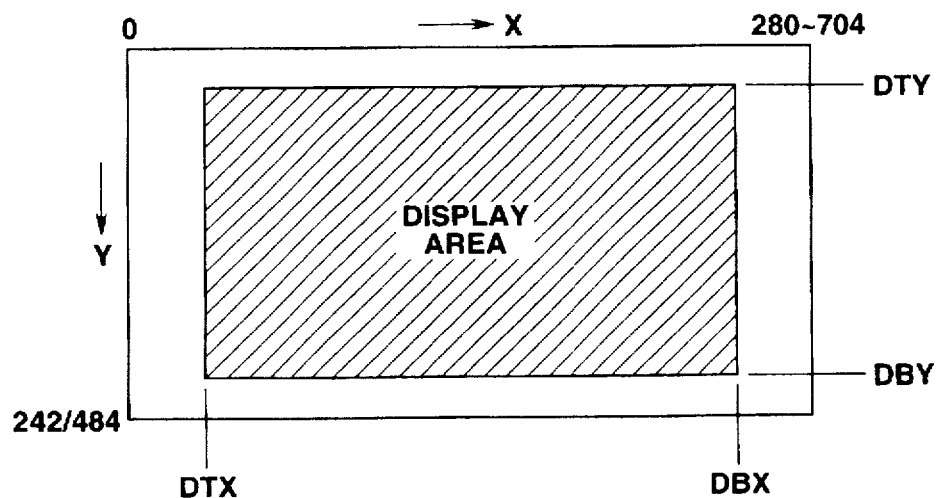
FIG. 3 is a diagram showing setting of representation on a display.

The size or the number of pixels of the display screen is variable and both the locations of display starting and end (expressed by (DTX,DTY) and (DBX,DBY) respectively on a coordinate plane) can separately be determined in the horizontal direction and the vertical direction respectively, as shown in FIG. 3.

The relation between a range of applicable values in the coordinate and the display mode is shown below. It is noted that DTX and DBX are multiples of 4. Hence, the minimum screen size consists of 4 pixels in horizontal by 2 pixels in vertical (in a noninterlaced mode) or 4 pixels (in an interlaced mode).

*The range of applicable values along the X axis:

| Mode | DTX | DBX |
| --- | --- | --- |
| 0 and 4 | 0 to 276 | 4 to 280 |
| 1 and 5 | 0 to 348 | 4 to 352 |
| 2 and 6 | 0 to 556 | 4 to 560 |
| 3 and 7 | 0 to 700 | 4 to 704 |
| 8 and 9 | 0 to 396 | 4 to 400 |

*The range of applicable values along the Y axis:

| Mode | DTY | DBY |
| --- | --- | --- |
| 0 to 3 and 8 | 0 to 241 | 4 to 243 |
| 4 to 7 and 9 | 0 to 480 | 4 to 484 |

Furthermore, the GPU 62 supports two display color modes, 16-bit direct mode (32768 colors) and 24-bit direct mode (full color). The 16-bit direct mode (referred to hereinafter as a 16-bit mode) offers 32768 colors. Although it is limited to the number of displayable colors as compared with the 24-bit direct mode (referred to hereinafter as a 24-bit mode), the 16-bit mode allows color calculations of the GPU 62 to be carried out in 24-bit mode, and also has a dithering function which simulates a quasi-full-color (24-bit color) display. The 24-bit mode offers 16,777,216 colors (full color) and provides a bit-mapped display of image data transferred to the frame buffer 63, but fails to actuate any drawing action by the GPU 62. While the bit length of a pixel comprises 24 bits, the coordinate and location values on the frame buffer 63 have to be determined on the basis of 16-bit format. For example, 24-bit image data of 640×480 is treated as 960×480 in the frame buffer 63. Also, DBX is expressed by a multiple of 8. Accordingly, the minimum display size in the 24-bit mode is 8 pixels in horizontal by 2 pixels in vertical.

The drawing functions of the GPU 62 are next described. The drawing functions include:

sprite drawing for generating sprites (e.g., a polygon) ranging from 1×1 dots to 256×256 dots in a 4-bit CLUT mode (4-bit format with 16 colors per sprite), 8-bit CLUT mode (8-bit format with 256 colors per sprite), and 16-bit CLUT mode (16-bit format with 32768 colors per sprite);

polygon drawing for executing drawing of a polygon (triangle, quadrilateral, and the like) of which each vertex is defined by coordinate values and then, performing flat shading for filling the polygon with a single color, Gouraud shading for providing a graduation on the polygon by assigning a different color to each vertex, and texture mapping for applying (a texture pattern of) two-dimensional image data onto the surface of the polygon;

line drawing in which gradation is applicable; and image data transfer for transferring image data from the CPU 51 to the frame buffer 63, from the frame buffer 63 to the CPU 51, and from the frame buffer 63 to the same.

Another function may be added, such as semitransparent rendering, wherein pixels are averaged (also known as alpha blending because data of pixels are combined together at a desired or alpha ratio), dithering for smoothing the interface of colors with the use of noise, clipping for eliminating features outside of the drawing area, or offsetting, in which the origin of the drawing is shifted depending on the drawing area.

Figure 4:
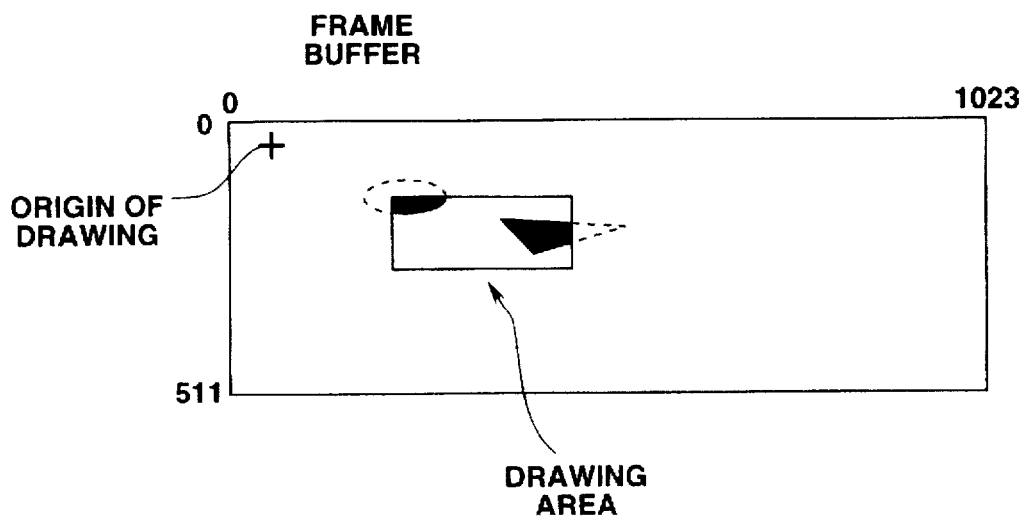
FIG. 4 is a diagram illustrating the clipping function for drawing.

The coordinate system on which a graphic is drawn is based on an 11-bit format, thus assigning each value of X and Y to a range of −1024 to +1023. As shown in FIG. 4, the size of the frame buffer 63 is 1024×512 and any extension may be folded. The origin of a drawing can arbitrarily be determined within the frame buffer 63 by controlling offset values of the coordinates. Because of the clipping function, the drawing is applicable to any shape only within the frame buffer 63.

As the sprite supported by the GPU 62 represents 256× 256 dots at the maximum, its horizontal and vertical lengths can freely be determined within that range.

Figure 5:
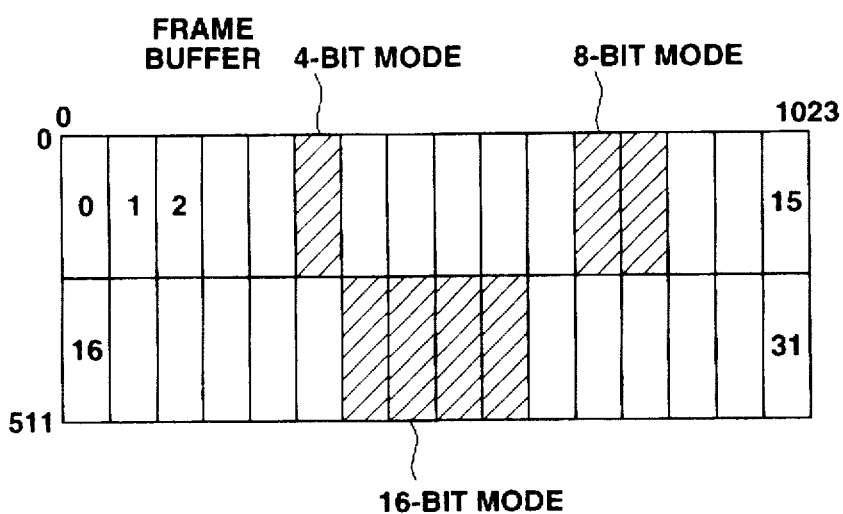
FIG. 5 is a diagram illustrating a texture page.

Image data (of a sprite pattern) to be attached to the sprite is allocated to a non-display area of the frame buffer 63 as shown in FIG. 5. Hence, the sprite pattern is transmitted to the frame buffer 63 before starting the command of drawing. A number of the sprite patterns may be preserved in the form of page units of 256×256 pixels so long as memory areas of the frame buffer 63 are available. The 256×256 pixel size is called a texture page. The location of each texture page is determined by assigning a page number to the parameter of a drawing command termed TSB for specifying the (address) point of texture page.

The sprite pattern is classified into three types of the color mode, 4-bit CLUT mode, 8-bit CLUT mode, and 16-bit CLUT mode. The 4-bit and 8-bit CLUT modes employ a CLUT.

Figure 6:
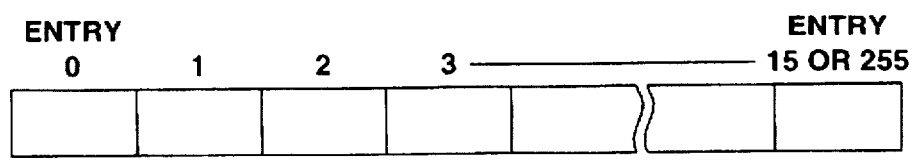
FIG. 6 is a diagram showing the structure of a CLUT.

The CLUT is shown in FIG. 6 where 16 to 256 of R, G, and B values of the three primary colors for creating visible colors to be displayed are aligned on the frame buffer 63. The R, G, and B values are numbered up in a sequence from the left end of the frame buffer 63 and the color of a pixel in the sprite pattern is identified by the number. The CLUT can be selected for every sprite and the sprites may be associated with their respective CLUTs. In FIG. 6, each entry represents a single pixel of the 16-bit mode and each CLUT is equal to 1×16 bits (in the 4-bit mode) or 1×255 bits (in the 8-bit mode) of the image data. The location of storage of the CLUT in the frame buffer 63 is determined by assigning coordinate values at the left end of the CLUT to be used to the parameter of a drawing command termed CBA for specifying the (address) point of CLUT.

Figure 7:
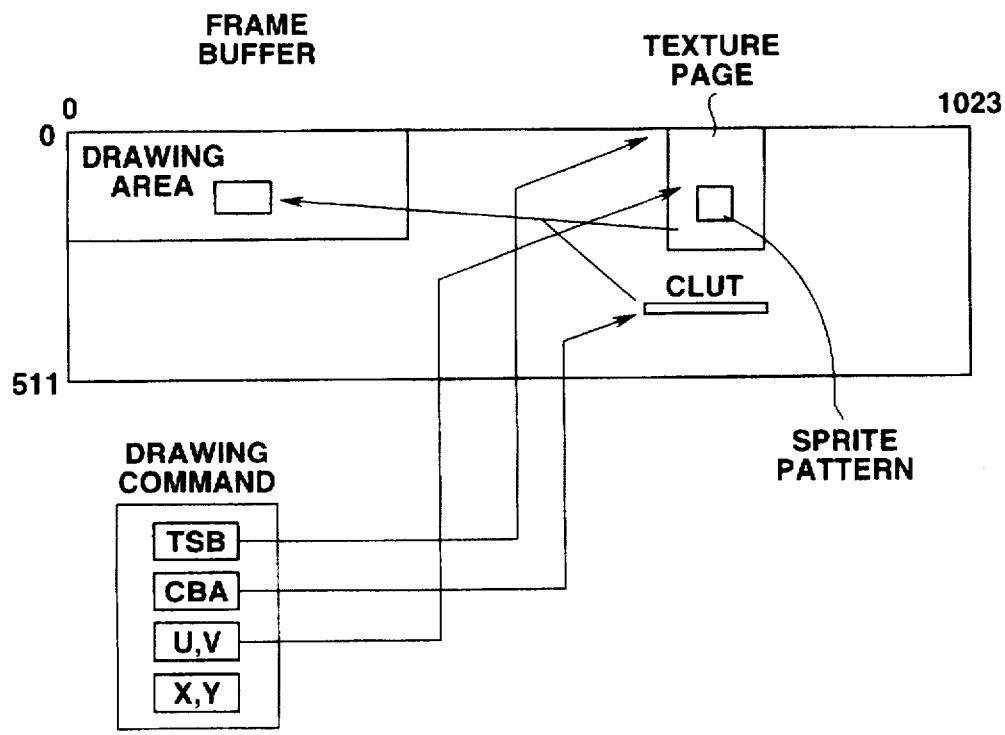
FIG. 7 is a diagram illustrating the fundamentals of drawing a sprite.

The drawing of a sprite is schematically shown in FIG. 7, in which U and V of the drawing commands are parameters for specifying the location in a texture page as expressed in a horizontal direction and a vertical direction respectively. Also, X and Y are parameters for specifying the location of a drawing area.

Figure 8:
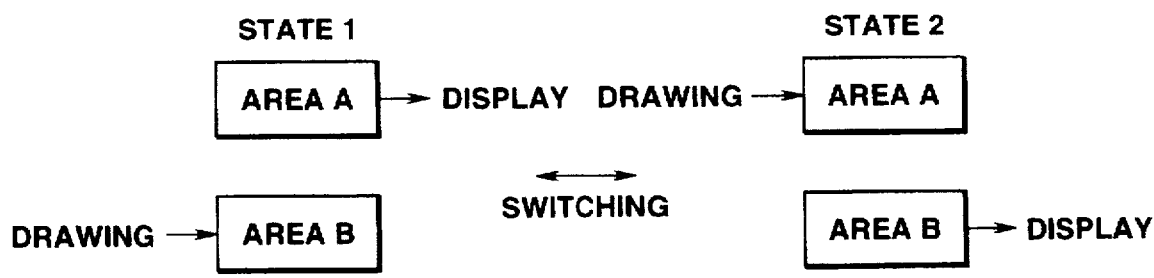
FIG. 8 is a diagram illustrating frame double buffering.

The GPU 62 employs a motion display technique known as frame double buffering in which, as shown in FIG. 8, two quadrilateral patterns are prepared on the frame buffer 63; one is displayed while a graphic is being mapped in the other. When the drawing has been completed, the two patterns are switched over. This allows the display of rewriting action to be avoided. The switching over on the frame buffer 63 may be carried out during the vertical interval. Also, as the shape and origin of coordinates of a graphic to be drawn are arbitrarily determined in the GPU 62, they can be utilized with movements for appointing a plurality of the buffers.

A data format produced by the image data processing method of the present invention in the prescribed image processing apparatus is next described.

The graphics handled in the image processing apparatus of the first described embodiment of the invention are classified into two types, three-dimensional graphic and fundamental two-dimensional graphic. The three-dimensional graphic is implemented by modeling data (referred to hereinafter as TMD data) representing a facet attribute of the shape of a realistic model or object to be drawn, and animation data (referred to hereinafter as TOD data) including location data of the object. The two-dimensional data includes image data (referred to hereinafter as TIM data) used as a sprite pattern or texture base, BG map data (referred to as BGD data) for mapping a background, cell data (referred to as CEL data) and information data (referred to as ANM data) for animating the sprite.

The format of the TOD animation data (which is referred to as TOD format) is designed to allocate data of the three-dimensional object on a time-base. More particularly, each frame of three-dimensional animation (composed of a series of frames) is expressed with essential data for generating, varying, and terminating the three-dimensional object, and the data in the frame is aligned along a time-base.

Figure 9:
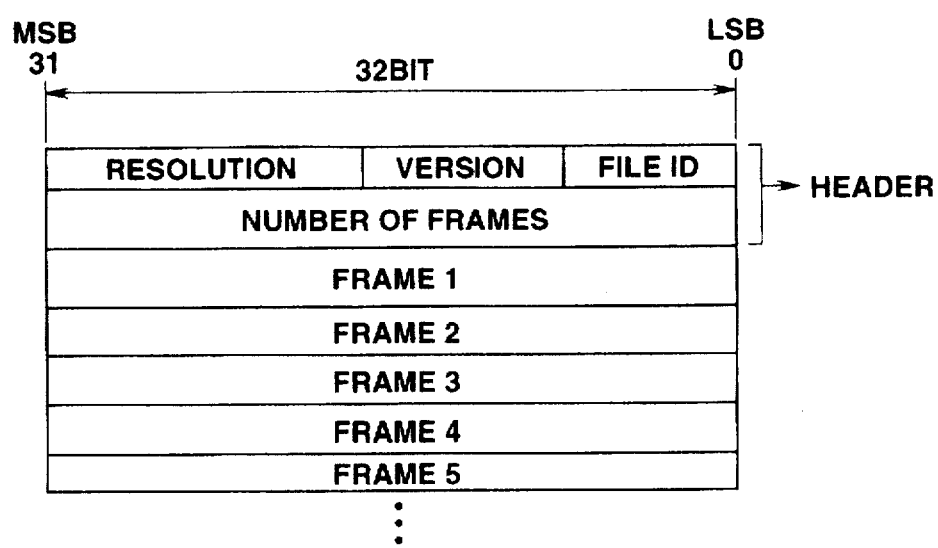
FIG. 9 is a diagram showing the format of a TOD file.

A file in the TOD format (which is referred to as TOD file) consists of a file header and a series of the frame data, as shown in FIG. 9. The HEADER shown in FIG. 9 comprises two words (of 64 bits) located at the front end of the TOD file, carrying four different types of information which are:

(a) "file ID" (8 bits) "file ID" indicates the file as an animation file;

(b) "version" (8 bits) indicating a version of the animation;

(c) "resolution" (16 bits) "resolution" represents a length of time (in ticks of 1/60 second) during which a frame is being displayed; and (d) "number of frames" (32 bits) indicating the number of frames in the file.

The HEADER is followed by a number of FRAMEs which are aligned in a time sequence.

Figure 10:
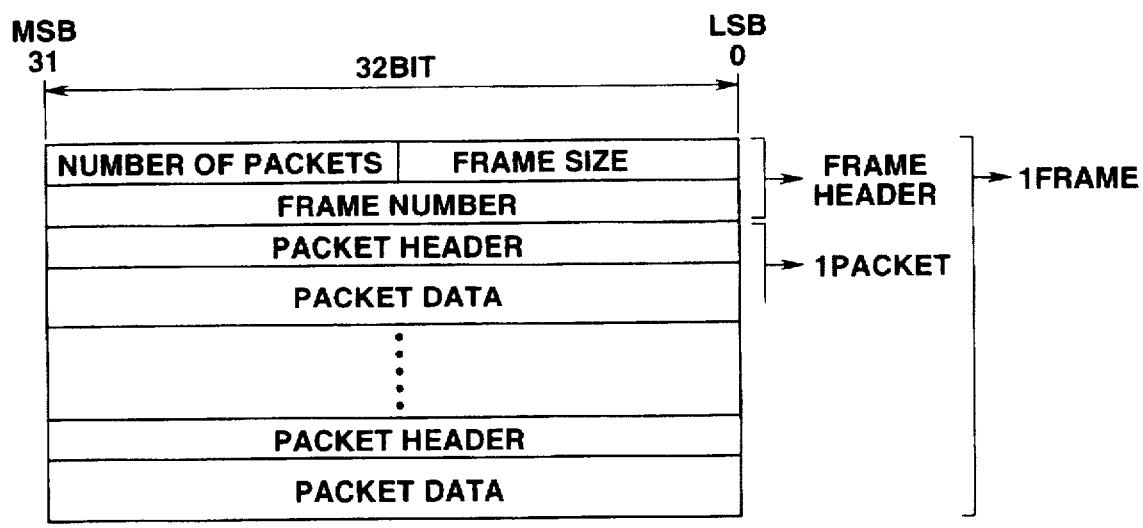
FIG. 10 is a diagram showing the format of a FRAME in the TOD format.

As shown in FIG. 10, FRAME comprises a "frame header" and a series of PACKETS.

The "frame header" located at the front end of the FRAME of FIG. 10 contains two words which carry the following information:

(a) "frame size" (16 bits) indicating the size of the entire frame data (including the frame header) expressed in (4-byte) words;

(b) "number of packets" (16 bits) representing the number of packets in the frame; and (c) "frame number" (32 bits) indicating the number of the frame. The "frame header" is followed by a number of PACKETs.

Figure 11:
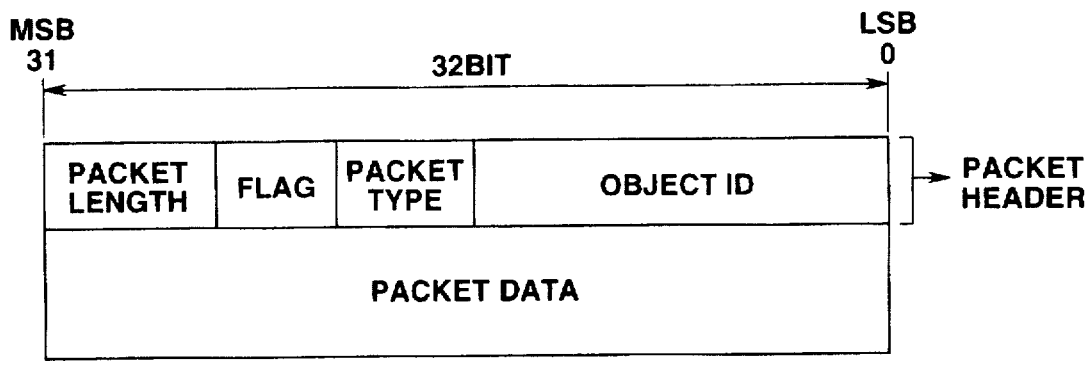
FIG. 11 is a diagram showing the format of a PACKET of a FRAME.

As shown in FIG. 11, PACKET comprises a "packet header" of one word and a "packet data". The type of PACKET is not always the same and the "packet data" in each PACKET is varied not only when the PACKET type is different, but also when it is identical.

As shown in FIG. 11, PACKET comprises a "packet header" and a "packet data". The "packet header" contains the following information:

(a) "object ID" (16 bits) "object ID" indicates the type of a target object;

(b) "packet type" (4 bits) representing a type of the packet explaining contents of "packet data";

(c) "flag" (4 bits) depending on "packet type"; and (d) "packet length" (8 bits) indicating the length of the packet (including the "packet header") expressed in (4-byte) words.

The "packet data" also contains other information including TMD data ID (ID of modeling data) and SRST values which will be subsequently described. PACKET is identified by the "packet type" stored in the header. The "packet type" is denoted by a set of numbers assigned to data details as shown below:

| | |
|---|---|
| 0 | Attribute |
| 1 | Coordinate (RST) |
| 10 | TMD data ID |
| 11 | Host object ID |
| 100 | MATRIX value |
| 101 | TMD data content |
| 110 | Light source |
| 111 | Camera |
| 1000 | Object control |
| 1001–1101 | User definition |
| 1110 | System reservation |
| 1111 | Specific command |

These will be subsequently explained in greater detail.

"Attribute" is expressed with 0000 of the "packet type", indicating that "packet data" contains information for attribute setting. In this case, "flag" is not used.

Figure 12:
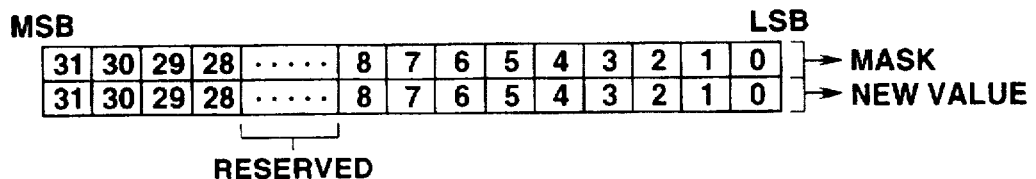
FIG. 12 is a diagram illustrating the structure of "packet data" of the attribute type.

The "packet data" consists of two words, as shown in FIG. 12. The first word is a mask comprising value change signing bits and no change signing bits. The value change signing bits are expressed by 0 and the no change signing bits are denoted by 1. In the second word, bits indicated by the value change signing bits are loaded with new data and the remaining bits are expressed by 0. The defaults assigned to the bits of no change are different, 1 in the first word and 0 in the second word. The bits of the second word in "packet data" carry the following details:

Bits 0 to 2 Material decay: 00 (Material decay 0) 01 (Material decay 1) 02 (Material decay 0) 03 (Material decay 1)

Bit 3 Lighting mode 1: 0 (without mist) 1 (with mist)

Bit 4 Lighting mode 2: 0 (with material) 1 (without material)

Bit 5 Lighting mode 3: 0 (User lighting mode) 1 (User default lighting mode)

Bit 6 Light source: 0 (with no light source calculation) 1 (On for light source calculation)

Bit 7 At overflow: 0 (with Z overflow clip) 1 (without Z overflow clip)

Bit 8 Back clip: 0 (Yes) 1 (Non)

Bits 9 to 27 System reservation (Initialized by 0) Bits 28 to 29 Semitransparency rate: 00 (50%) 01 (Added 100%) 10 (Added 50%) 11 (Added 25%)

Bit 30 Semitransparency: 0 (On) 1 (Off)

Bit 31 Display: 0 (Yes) 1 (No)

Figure 13:
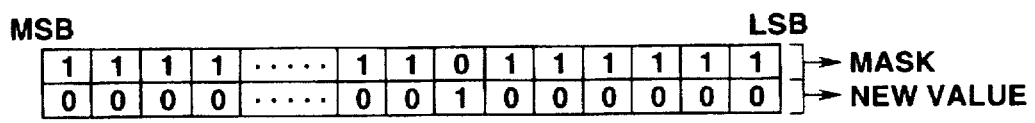
FIG. 13 is a diagram illustrating the structure of "packet data" for turning on the light source calculation.

When the light source calculation is set to on, bits in "packet data" are as shown in FIG. 13. As apparent, bit 6 in the first word is 0 indicating that change is requested for the light source information while the other bits of no change remain 1. In the second word, bit 6 is 1 indicating the light source calculation is on and the other bits not changed remain at the default value 0.

Figure 14:
FIG. 14 is a diagram illustrates the structure of a "flag" of the coordinate (RST) type.

"Coordinate (RST)" is expressed with 0001 of the "packet type" and "packet data" contains data for setting the coordinate values. In this case, "flag" is illustrated in FIG. 14. As shown, "matrix type" represents the type of an RST matrix; for example, 0 indicates an absolute and 1 is a differential matrix from the previous frame. Also, "rotation" means a flag of rotation (R); 0 is no and 1 is yes. "Scaling" is a flag of scaling (S); 0 is no and 1 is yes. Similarly, "translation" is a flag of parallel movement (T); 0 is no and 1 is yes.

The assignment in "packet data" is varied depending on a pattern of bits of "rotation", "scaling", and "translation" (for parallel movement) in the "flag", as illustrated in FIG. 15. As shown, Rx, Ry, and Rz represent components of a rotation along the X-axis, Y-axis, and Z-axis respectively. Also, Sx, Sy, and Sz are components of a scaling along the X-axis, Y-axis, and Z-axis, respectively, and Tx, Ty, and Tz represent components of parallel movement along the X-axis, Y-axis, and Z-axis, respectively.

"TMD ID" is denoted by 0010 of "packet type" and "packet data" holds the modeling data (TMD data) ID of a target object, as shown in FIG. 16. The TMD data ID consists of two bytes.

"Host object ID" is expressed with 0011 of "packet type" and "packet data" stores the host object ID of a target object, as shown in FIG. 17. The host object ID comprises 2 bytes and, in this case, "flag" is not used.

"Matrix type" is denoted by 0100 of "packet type" and "packet data" holds data for setting coordinate members. In this case, "flag" is not used. FIG. 18 illustrates an assignment in "packet data".

When the "packet type" is 0101, "packet data" carries the TMD data, as will subsequently be explained in greater detail. "Light source" is expressed with 0110 of "packet type" and "packet data" holds data for a light source setting. In this case, "object ID" represents another light source, unlike a common "object ID". Also, "flag" holds specific information as shown in FIG. 19. In FIG. 19, "data type" indicates the type of data, an absolute when it is 0 and a difference from the preceding frame when it is 1. "direction" is a direction flag; 0 is no and 1 is yes. Similarly, "color" represents a color flag; 0 is no and 1 is yes. The assignment in "packet data" is varied depending on a pattern of bits of "direction" and "color" in "flag", as shown in FIG. 20.

When "packet type" is 0111 for "camera", "packet data" holds data for viewpoint data setting. The "object ID" is then a camera ID, but not a common "object ID". "flag" is also specified as shown in FIG. 21.

If the bit of "camera type" shown in FIG. 21 is 0, the remaining bits are as shown in FIG. 22. If it is 1, the remaining bits are as shown in FIG. 23. More specifically, "data type" indicates a type of data; 0 is an absolute value and 1 is a difference from the preceding frame, as apparent in FIG. 22. "position and reference" in FIG. 22 is a flag for viewpoint and reference location; 0 is no and 1 is yes. Similarly, "z angle", as shown in FIG. 22, is a flag for an angle of the reference location from horizontal; 0 is no and 1 is yes. In FIG. 23, "data type" also indicates a type of data; 0 is an absolute value and 1 is a difference from the preceding frame. "rotation" as shown in FIG. 23 is a flag for rotation (R); 0 is no and 1 is yes. Similarly, "translation" as shown in FIG. 23 is a flag of parallel movement (T); 0 is no and 1 is yes.

The assignment in "packet data" is thus varied depending on the contents of "flag" as shown in FIGS. 24 and 25.

"Object control" is expressed by 1000 of "packet type" as designed for controlling an object. In this case, "packet data" carries no information.

Finally, when "packet type" is 1111 for specific control, animation data is controlled.

The format of the modeling data (referred to hereinafter as TMD format) is next explained.

In common three-dimensional graphics, an object is expressed by a set of polygons. Data representing the object is called the modeling data. Vertices of each polygon are denoted by coordinate values in three-dimensional space. The coordinate transforming device described in the prior art is provided for converting vertex locations of a polygon by perspective view transformation to two-dimensional coordinate values which are then subjected to a rendering device for drawing. The data is transmitted to the rendering device in the form of packets. Commonly, one packet contains the data for a polygon. The packets vary in structure and size depending on the type of polygon.

In the previously described format, in accordance with the present invention, the structure of polygon data for a geometric graphic, except for one portion of the data, is arranged identically to the structure of a packet, thus allowing the coordinate transforming device to perform processing at a higher speed.

There are some applicable three-dimensional coordinate systems, including an object coordinate system for representing the shape and size of a three-dimensional object, a world coordinate system for indicating the location of a three-dimensional object in space, and a screen coordinate system for showing a three-dimensional object projected on a screen. For simplicity, the description will be made in conjunction with the object and screen coordinate systems for three-dimensional objects.

The (TMD) format of the present invention for data of object geometry or modeling data is intended for use in a three-dimensional extended graphics library of the image data processing apparatus of the foregoing embodiment, installed in a home video-game machine, microcomputer, or graphic computer. Data of the TMD format can be downloaded directly to a memory as factors of the functions attributed to the extended graphics library.

Information to be carried in a file (referred to hereinafter as a TMD file) of the TMD format stays in an RSD file for higher abstract text data during the use of a three-dimensional tool or artist tool, and is shifted by a specific command ("RSDlink" command) to the TMD format during production of a program.

The data in the TMD file is a set of primitives representing polygons and lines of an object. A single TMD file can hold a plurality of objects to be drawn.

Coordinate values in the TMD file are designated in the space handled in the extended graphics library of the image data processing apparatus of the present invention, in which the direction towards the right is in a positive direction along the x-axis, downward is in a positive direction along the y-axis, and rearward is in a positive direction along the z-axis. The coordinate values of the object are expressed by signed integrals of 16-bit data and each coordinate value ranges −32767 to +327687. In a format in the designing step (referred to as an RSD format), the values of a vertex are floating point numbers and thus, the files to be shifted from RSD to TMD have to be matched in the scale by expansion and compression. For that purpose, scale adjusting references are prepared and installed in an object structure to be subsequently explained. When the values of vertices in the TMD format data are multiplied by the scale references, they are returned to the original scale at the designing step. This assists in determining an optimum scale for mapping of values in the world coordinate system.

The TMD format according to the present invention is next explained in greater detail.

Figure 26:
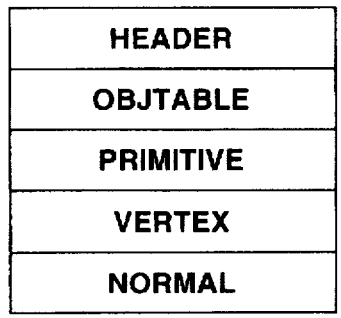
FIG. 26 is a diagram showing a TMD format.

As shown in FIG. 26, the TMD format comprises four blocks containing table data for a three-dimensional object (OBJ TABLE) in a TMD file, primitive data (PRIMITIVE), vertex data (VERTEX), and normal data (NORMAL).

Figure 27:
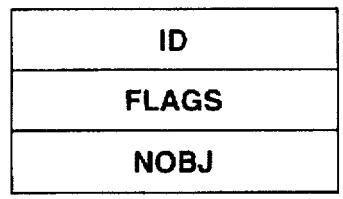
FIG. 27 is a diagram showing the structure of a HEADER of the TMD format.

A header (HEADER) of the TMD format in FIG. 26 holds three words (12 bytes) carrying data of the format structure illustrated in FIG. 27. As shown in FIG. 27, ID is data of 32 bits (a word) representing a version of the TMD file. FLAGS is also 32 bits of data (a word) representing a type of the structure of the TMD format. The least significant bit (LSB) is an FIXP bit, to be subsequently described, and the other bits are all reserved as denoted by Os. The FIXP bit indicates whether the pointer of the object construction is a real address or not, and this will also be subsequently explained in greater detail.

When the FIXP bit is 1, the pointer is a real address. If 0, it is an offset from the front. NOBJ is an integral representing the number of objects.

Figure 28:
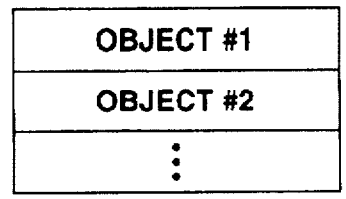
FIG. 28 is a diagram showing the structure of an OBJTABLE of the TMD format.

The OBJ TABLE of FIG. 26 contains a table comprising a group of object structures accompanied by pointers indicating the storage locations of the objects, as shown in FIG. 28. Each object structure is expressed by:

```
struct object {    u_long *vert_top;
    u_long n_vert;
    u_long *normal_top;
    u_long n_normal;
    u_long *primitive_top;
    u_long n_primitive;
    long scale;
}
where
    vert_top:       VERTEX front-end address,
    n_vert:         VERTEX number,
    normal_top:     NORMAL front-end address,
    n_normal:       NORMAL number,
    primitive_top:  PRIMITIVE front-end address,
    n_primitive:    POLYGON number,
    scale:          Scaling factor.
```

The pointers (vert_top, normal_top, and primitive_top) in the object structure are varied depending on the FIXP bit in HEADER. When FIXP is 1, the pointer is a real address. When FIXP is 0, the pointer is a relative address with the front end of OBJECT assigned to address 0.

The scaling factor is of "long" type with a sign and its power of 2 represents a scale value. For example, when the scaling factor is 0 of the object structure, the scale is 1/1. When it is 2, the scale is 4 and when −1, the scale is 1/2.

Figure 29:
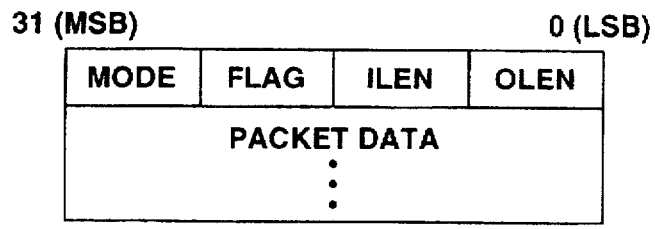
FIG. 29 is a diagram showing the structure of a PRIMITIVE of the TMD format.

The PRIMITIVE of FIG. 26 contains a series of packets for primitives of the object, as shown in FIG. 29. Each individual packet carries a single primitive. The primitives defined by the TMD format are used with the functions in the extended graphic library for perspective transforming, and are converted to drawing primitives. The packet shown in FIG. 29 is variable in length and its size and structure are changed depending on the type of primitive.

Figure 30:
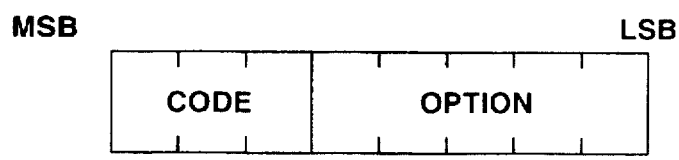
FIG. 30 is a diagram showing the structure of a "mode" of a PRIMITIVE.

The "Mode" in the packet of FIG. 29 comprises 8 bits indicating the type and attribute of its primitive and its assignment is shown in FIG. 30. 3 bits of CODE in FIG. 30 represent a code indicative of the type of contents; 001 is a polygon (triangle, quadrilateral, etc), 010 is a line, and 011 is a sprite rectangle. Also, OPTION holds optional bits and is varied depending on a value of CODE (which is typed in a list of the packet data components to be subsequently explained.)

Figure 31:
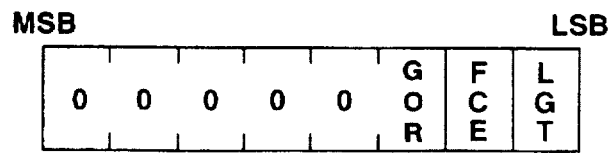
FIG. 31 is a diagram showing the structure of a "flag" of a PRIMITIVE.

The "Flag" in the packet of FIG. 29 is an 8-bit data representing optional information for rendering and its assignment of bits is shown in FIG. 31. GOR in FIG. 31 is available with requirements of light source calculation and no texture, and application of polygon. When GOR is 1, it indicates a gradation polygon and when 0, a single color polygon. When FCE is 1, the polygon is of two sided and when 0, the same is single sided (applicable when CODE represents a polygon code). Also, when LGT is 1, the light source calculation is not involved and when 0, the same is involved. "ilen" of FIG. 29 contains an 8-bit data representing a word length of the packet data. Similarly, "olen" is 8-bit data indicating a word length of the drawing primitive generated during the process. "packet data" is composed of various parameters for vertex and normal which are determined by the type of primitive. The structure of "packet data" will also be subsequently explained in greater detail.

Figure 32:
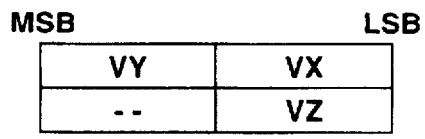
FIG. 32 is a diagram showing the structure of a VERTEX of the TMD format.

The VERTEX shown in FIG. 26 is a train of data structures representing vertices. The format of each structure is illustrated in FIG. 32. In FIG. 32, VX, VY, and VZ are x, y, and z coordinate values (16-bit integer) of a vertex, respectively.

The NORMAL in FIG. 26 is a train of data structures indicating normals. The format of each structure is shown in FIG. 33 in which NX, NY, and NZ are x, y, and z components (16-bit fixed decimal point fraction) of a normal, respectively. More particularly, NX, NY, and NZ are expressed by signed 16-bit decimal point fractions where 4096 represents 1.0. Their bit assignment is shown in FIG. 34 in which the sign is expressed by one bit, an integer is 3 bits, and a fraction is 12 bits.

The packet data structures which depend on the types of the primitive are next explained. The parameters in the packet data are classified into Vertex(n), Normal(n), Un, Vn, Rn, Gn, Bn, TBS, and CBA.

Vertex(n) is a 16-bit index value pointing to the location of VERTEX. It is indicative of the number of an element counted from the front end of the VERTEX format shown in FIG. 26, specifying an object including the polygon.

Normal(n), like Vertex(n), represents a 16-bit index value pointing to the location of NORMAL.

Un and Vn are x and y coordinate values, respectively, on the texture source space of each vertex.

Rn, Gn, and Bn are R, G, and B values, respectively, representing a color of the polygon as expressed by unsigned 8-bit integers. If the light source calculation is not involved, defaults of luminance have to be preliminarily provided.

The parameter TBS carries information on texture and sprite pattern and its format is shown in FIG. 35. TPAGE in FIG. 35 represents the number (0 to 31) of a texture page. Also, ABR is a semitransparency rate (mixing rate) and only eligible when ABE is 1. When ABR is 00, the rate is 50%back+50%polygon. When it is 01, 100%back+100%polygon. When 10, 100%back+50%polygon. When 11, 100%back−100%polygon. TPF in FIG. 35 represents a color mode. 00 of TPF gives a 4-bit mode, 01 means an 8-bit mode, and 10 represents a 16-bit mode.

Figure 36:
FIG. 36 is a diagram showing the structure of the CBA parameter in "packet data" of a PRIMITIVE.

The parameter of CBA indicates the storage location of the CLUT in the frame buffer 63, as shown in FIG. 36. CLX of FIG. 36 is 6 upper bits of 10 bits of the X coordinate value of CLUT in the frame buffer 63 and CLY is 9 bits of the Y coordinate value of CLUT in the frame buffer 63.

The structure of the packet data itself is next explained. The explanation is first made referring to a polygon of a triangular shape with the light source calculation.

Figure 37:
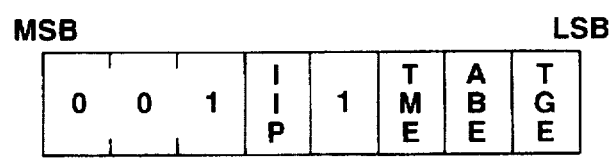
FIG. 37 is a diagram of bit assignment of "mode" with the application of s triangle polygon and light source calculation, showing a modification of "packet data" of a PRIMITIVE.

FIG. 37 shows the bit assignment of a mode value in PRIMITIVE. As shown, IIP represents a shading mode; 0 gives a flat shading mode and 1 provides a Gouraud shading mode. Also, TME is used for assigning a texture; 0 represents off and 1 is on. TGE offers a luminance calculation during the texture mapping; 0 is on and 1 is off (in which a texture is directly applied). These parameters are applicable to any polygon shape.

The packet data structure is as shown in FIG. 38. More specifically, FIG. 38A shows a flat shading mode in a single color with the texture assignment turned off. FIG. 38B is in a Gouraud shading mode in a single color with the texture assignment being off. FIG. 38C is a flat shading mode in gradation with the texture assignment being off. FIG. 38D is in a Gouraud shading mode in gradation with the texture assignment being off. FIG. 38E is in a flat shading mode with the texture assignment turn on. FIG. 38F is in a Gouraud shading mode with the texture assignment being on. Meanwhile, "mode" and "flag" express a state of a single sided polygon with semitransparency being off.

An example of the packet data structure is next explained, referring to a polygon of a triangular shape without use of the light source calculation. The bit assignment of a mode value in PRIMITIVE is identical to that of FIG. 37.

Figures 39A, 39B, 39C, 39D, 40:
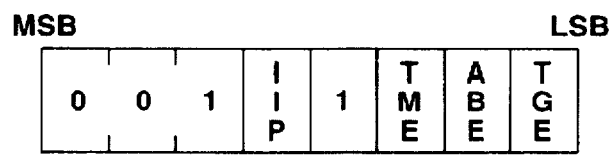
FIGS. 39A–39D are diagrams illustrating the structure of "packet data" of a PRIMITIVE with the application of the triangle polygon, but without light source calculation.
FIG. 40 is a diagram of bit assignment of "mode" with the application of a quadrilateral polygon and light source calculation, showing a modification of "packet data" of a PRIMITIVE.

The packet data structure is as shown in FIG. 39. In more detail, FIG. 39A shows a flat shading mode with the texture assignment turned off. FIG. 39B is in a Gouraud shading mode in gradation with the texture assignment being off. FIG. 39C is a flat shading mode with the texture assignment being on. FIG. 39D is in a Gouraud shading mode in gradation with the texture assignment being on.

Another example of the packet data structure is next explained, referring to a polygon of a quadrilateral shape and using the light source calculation.

The bit assignment of a mode value in PRIMITIVE is shown in FIG. 40, in which bits are assigned in the same manner as in FIG. 37.

The packet data structure is specified as shown in FIG. 41. In particular, FIG. 41A shows a flat shading mode with the texture assignment turned off. FIG. 41B is in a Gouraud shading mode with the texture assignment being off. FIG. 41C is a flat shading mode in gradation with the texture assignment being off. FIG. 41D is in a Gouraud shading mode in gradation with the texture assignment being off. FIG. 41E is a flat shading mode with the texture assignment being on. FIG. 41F is a Gouraud shading mode with the texture assignment being on.

A further example of the packet data structure is next explained, referring to a polygon of a quadrilateral shape without use of the light source calculation.

The bit assignment of a mode value in PRIMITIVE is shown in FIG. 40, in which bits are assigned in the same manner as in FIG. 37.

The packet data structure is as shown in FIG. 42. More specifically, FIG. 42A shows a flat shading mode with the texture assignment turned off. FIG. 42B is in a Gouraud shading mode with the texture assignment being off. FIG. 42C is a flat shading mode with the texture assignment being on. FIG. 42D is in a Gouraud shading mode (in gradation) with the texture assignment being on.

The packet data structure is next explained, referring to lines.

The bit assignment of a mode value in PRIMITIVE is shown in FIG. 43. IIP in FIG. 43 represents on and off of the gradation; when it is 0, the gradation is off (in a single color and when 1, the gradation is on. Also, ABE indicates on and off of the semitransparency processing; 0 represents off and 1 is on.

The packet data structure of this example is as shown in FIG. 44. FIG. 44A shows the gradation being off, and FIG. 44B indicates the gradation being on.

The packet data structure is next explained, referring to a three-dimensional sprite. The three-dimensional sprite has three-dimensional coordinate values and its graphic contents are similar to those of a common sprite. The bit assignment of a mode value in PRIMITIVE is shown in FIG. 45. SIZ in FIG. 45 is the size of the sprite; 00 represents a free size (determined by W and H values), 01 is a size of 1×1, 10 is 8×8, and 11 is 16×16. Also, ABE indicates the semitransparency processing; 0 represents off and 1 is on.

The packet data structure is specified as shown in FIG. 46. As will be apparent, FIG. 46A shows a sprite size being free, FIG. 46B represents a sprite size of 1×1, FIG. 46C gives 8×8, and FIG. 46D is 16×16.

In the TMD file format shown in FIG. 26, a region carrying the modeling data representing the shape of an object is identical in part to the prior art packet data structure. This allows the GTE 61 (coordinate transforming device) to complete a processing of the region by simply copying data on the basis of a word. For example, three regions 1, 2, and 3 shown in FIG. 38F may correspond to the prior art packet data.

Figure 47:
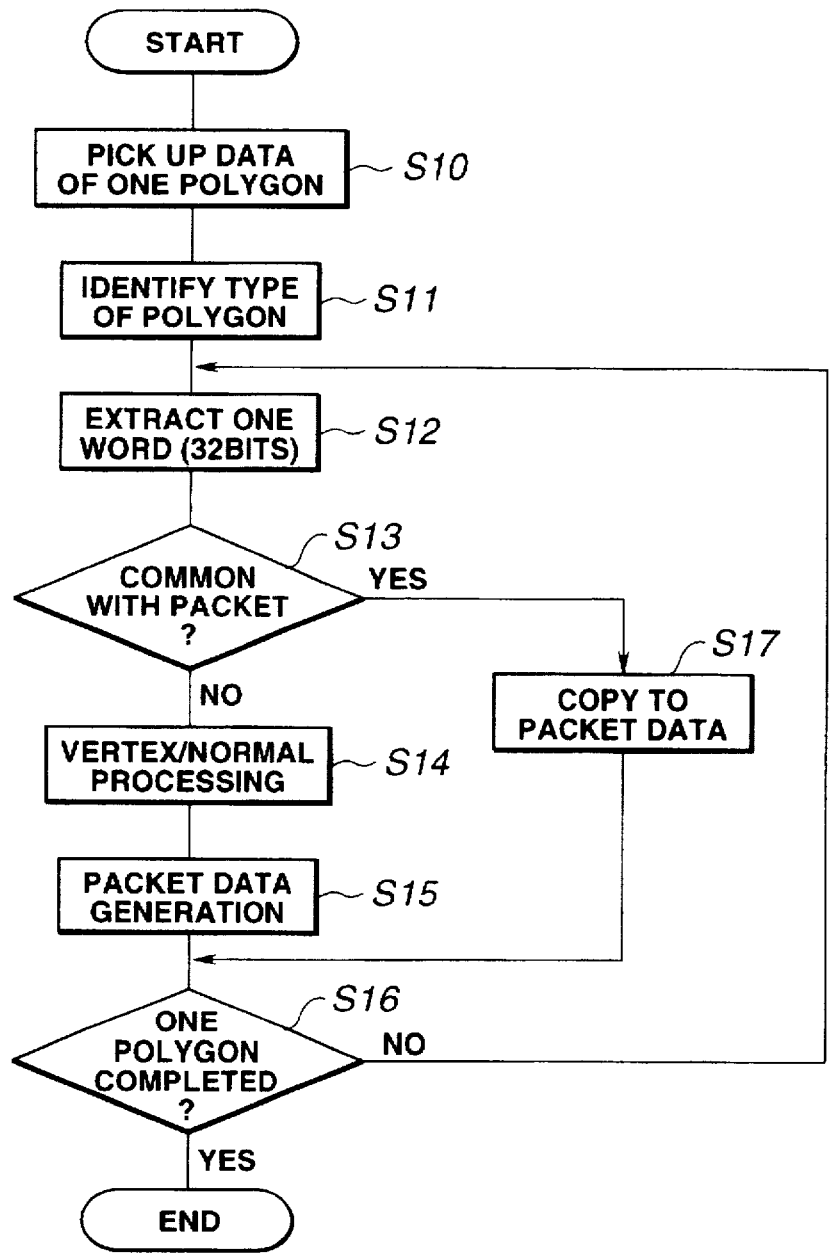
FIG. 47 is a flow chart illustrating the sequence of steps for perspective view transforming the TMD format data of the present invention.

A sequence of actions of the GTE 61 upon receipt of the TDM format data is next described referring to FIG. 47.

As shown in FIG. 47, data of a target polygon is picked up at Step S10 and classified into types at Step S11. Then, a word (32 bits) is extracted at Step S12 and examined at Step S13 whether or not it is common with the packet data. When the word is common, it is copied to the packet data at Step S17. If it is not common, the procedure goes to Step S14 where a process is made according to VERTEX and NORMAL. This is followed by producing a packet data at Step S15. Then, it is examined at Step S16 whether the coordinate transforming of one polygon is completed or not. If not, the procedure returns back to Step S12 and if yes, it is ended.

Figure 48:
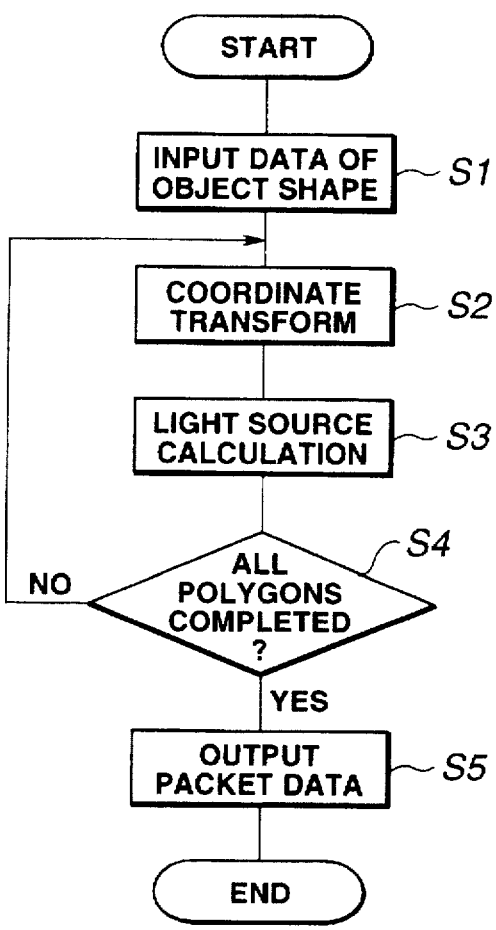
FIG. 48 is a flow chart illustrating the sequence of actions performed in a common three-dimensional graphic coordinate transforming device.

FIG. 48 shows a substantial sequence of steps for coordinate transforming three-dimensional graphic data. Data of the shape of an object (modeling data) is input at Step SI and is coordinate transformed at Step S2. This is followed by the light source calculation at Step S3. It is then examined at Step S4 whether the processing of all the polygons is completed or not. If not, the procedure goes back to Step S2. If it is judged yes at Step S4, a packet data is released at Step S5.

Figure 49:
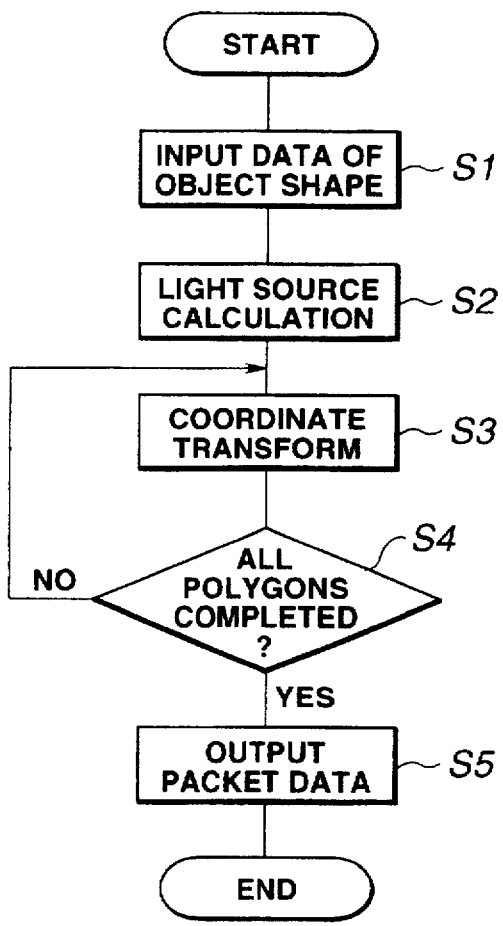
FIG. 49 is a flow chart illustrating the sequence of actions of the coordinate transforming device when the shading on an object is not performed in real time.

For varying the image in real time, the steps S2 and S3 have to be repeated at a high speed. When the shading does not need to be performed in the real time, its step S3 is removed from a loop, thus shifting to the flow chart shown in FIG. 49. When it is judged no at Step S4 of FIG. 49, the procedure returns back to Step S3. In this case, three regions 0, 3, and 6 of FIG. 38F, for example, are determined only one time and the coordinate transforming step will be less loaded.

Another form of the format for the object shape data (modeling data), in accordance with the present invention, is next explained for simplifying the coordinate transforming process when the shading is not performed in real time. FIG. 50 shows the format of a file for another embodiment of the present invention.

Provided at the head of the file are data, denoted by TYPE, representing the type and attribute of polygons and data, denoted by NPACKET, indicating the number of the polygons. These two items are followed by a set of "polygon data" blocks which are equal in number to the polygons.

"Polygon data" is shown in FIG. 51 and contains two packet data and three-dimensional coordinate values for vertices of the polygon.

The packet data of FIG. 51 is composed as shown in FIG. 52, which is similar to that of FIG. 57. It is also varied in structure and length depending on the type of polygon. In this embodiment, since the shading on the object is not computed in real time, the following parameters may be written before starting the coordinate transformation:

CODE,
(B0, G0, R0),
(V0, U0),
(B1, G1, R1),
(V1, U1), (B2, G2, R2),
(V2, U2).

When the above parameters have been determined, a point from the location of each vertex is denoted by:

(Y0, X0), (Y1, X1),
(Y2, X2)

is only calculated for the coordinate transformation, whereby the procedure of coordinate transformation is simplified. Also, it is unnecessary to provide a storage area for the packet data in the memory.

According to this embodiment of the present invention, the memory is only filled with data to be varied in the coordinate transformation process, thus contributing to the saving of both time and labor.

As set forth above, the structure of the three-dimensional image data, in accordance with the present invention, excluding the information to be perspective view transformed, is arranged identical to that of the given transmission standard of the two-dimensional image data. Hence, when the information to be perspective view transformed for the three-dimension data has been processed, a corresponding two-dimensional image data of the given transmission standard is obtained. More specifically, an original file containing the data to be transformed can easily be converted to the new format.

In addition, the three-dimensional image data, in accordance with the present invention, is capable of carrying data for shading on an object to be drawn on a two-dimensional display, thus eliminating extra calculation for generating the shading data during reproduction of the two-dimensional image data.

Hence, the present invention satisfies a long existing need for enhanced image data processing in which a file containing original image data to be transformed is easily converted into a new format, for an image data processing apparatus for processing such image data and a recording medium for carrying such enhanced image data.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. A method for producing three-dimensional image data which is to be converted by perspective view transformation into two-dimensional image data and transferred in a given transmission standard to draw an image on a two-dimensional display screen, said method comprising the steps of:

structuring a data format for holding said three-dimensional image data, said data format excluding said three-dimensional image data to be perspective view transformed, said data format being configured identical to that of said given transmission standard for said two-dimensional image data; and recording said data format to a recording medium.

2. The method of claim 1, wherein said data format includes data for an individual polygon.

3. The method of claim 1, wherein said data format includes texture data.

4. The method of claim 1, wherein said data format is for a rendering command which includes a combination of individual polygon coordinate data and texture data for said polygon.

5. The method of claim 4, wherein said polygon coordinate data is perspective-view transformed coordinate data.

6. The method of claim 1, wherein said image data includes information about shading on an object to be drawn on said two-dimensional display screen.

7. An apparatus for processing image data, said apparatus comprising:

means for converting three-dimensional image data by perspective view transformation into two-dimensional image data;

means for structuring said three-dimensional image data, excluding any three-dimensional image data to be perspective-view transformed, in a data format identical to that of a given transmission standard for said two-dimensional image data;

means for discriminating said three-dimensional image data to be perspective view transformed from other three-dimensional image data;

means for combining said perspective-view transformed image data with said other three-dimensional image data to provide a rendering command having a format identical to that of said given transmission standard; and drawing means for receiving said rendering command and for drawing a corresponding image on a two-dimensional display screen.

8. The apparatus of claim 7, wherein said data format includes data for an individual polygon.

9. The apparatus of claim 7, wherein said data format includes texture data.

10. The apparatus of claim 7, wherein said rendering command includes a combination of individual polygon coordinate data and texture data for said polygon.

11. The apparatus of claim 10, wherein said polygon coordinate data is perspective-view transformed coordinate data.

12. The apparatus of claim 7, wherein said three-dimensional image data includes information about shading of an object to be drawn on the two-dimensional display screen.

13. A recording medium used in an image data processing apparatus, said recording medium comprising:

a first storage element for carrying three-dimensional image data which is to be converted by perspective view transformation into two-dimensional image data and transferred in a given transmission standard to draw an image on a two-dimensional display; and a second storage element for carrying three-dimensional image data, excluding the three-dimensional data to be perspective view transformed, said second storage element having a data format identical to that of said given transmission standard.

14. The recording medium of claim 13, wherein said three-dimensional image data includes information about shading on an object to be drawn on the two-dimensional display screen.

15. The recording medium of claim 14, wherein said data format includes data for an individual polygon.

16. The recording medium of claim 14, wherein said data format includes texture data.

17. The recording medium of claim 14, wherein said data format is for a rendering command which includes a combination of individual polygon coordinate data and texture data for said polygon.

18. The recording medium of claim 17, wherein said polygon coordinate data is perspective-view transformed coordinate data.

19. An image data processing apparatus, comprising:
- (a) separation means for separating first data representing a three-dimensional image and second data for image data of a polygon;
- (b) converting means for converting said first data into two-dimensional image data;
- (c) instruction generating means for combining said converted two-dimensional image data with said second data to generate instruction data for each polygon.

20. The apparatus of claim 19, wherein said converting means converts said first data into said two-dimensional image data by perspective-view transformation.

21. The apparatus of either of claims 19 or 20, wherein said converting means is a graphical transformation engine.

22. The apparatus of claim 19, further comprising:
drawing means for drawing a graphic image on a graphic memory in response to said instruction data; and
means for providing said graphic image read out from said graphic memory to a display.

23. The apparatus of claim 22, wherein said drawing means is a graphical processing unit.

24. The apparatus of claim 19, wherein said second data denotes a texture mapped on said polygon.

25. The apparatus of claim 24, wherein said second data includes an address where texture graphic data is stored.

26. The apparatus of claim 19, wherein said first data includes the coordinates of vertices of said polygon.

27. The apparatus of claim 26, wherein said first data includes a pointer to where said coordinates of said polygon are stored.

28. A method for processing a three-dimensional image, comprising the steps of:
- (a) separating first data representing a three-dimensional image and second data for image data of a polygon;
- (b) converting said first data into two-dimensional image data;
- (c) combining said converted two dimensional image data with said second data to generate instruction data for each polygon.

29. The method of claim 28, wherein said instruction data provides a rendering command.

30. The method of claim 28, wherein said converting step converts said first data into said two-dimensional image data by perspective-view transformation.

31. The method of either of claims 28, 29 or 30, further comprising the steps of:
drawing a graphic image on a graphic memory in response to said instruction data; and
providing said graphic image read out from the graphic memory to a display.

32. The recording medium of any of claims 13–17 wherein said storage element is a CD-ROM.

33. An apparatus for processing image data, said apparatus comprising:
a graphical transformation engine for converting three-dimensional image data by perspective view transformation into two-dimensional image data;
means for structuring said three-dimensional image data, excluding any three-dimensional image data to be perspective-view transformed, in a data format identical to that of a given transmission standard for said two-dimensional image data;
a graphical transformation engine for discriminating said three-dimensional image data to be perspective view transformed from other three-dimensional image data;
means for combining said perspective-view transformed image data with said other three-dimensional image data to provide a rendering command having a format identical to that of said given transmission standard; and
a graphical processing unit for receiving said rendering command and for drawing a corresponding image on a two-dimensional display screen.

34. An image data processing apparatus, comprising:
- (a) a data separator for separating first data representing a three-dimensional image and second data for image data of a polygon;
- (b) a data transformation unit for converting said first data into two-dimensional image data;
- (c) an instruction generator for combining said converted two-dimensional image data with said second data to generate instruction data for each polygon.

* * * * *